US012693559B2

(12) United States Patent
Shimoshikiryoh

(10) Patent No.: US 12,693,559 B2
(45) Date of Patent: Jul. 28, 2026

(54) IMAGE PICKUP APPARATUS EQUIPPED WITH DISPLAY FUNCTION

(71) Applicant: Sharp Display Technology Corporation, Kameyama City (JP)

(72) Inventor: Fumikazu Shimoshikiryoh, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 18/916,937

(22) Filed: Oct. 16, 2024

(65) Prior Publication Data

US 2025/0123514 A1 Apr. 17, 2025

(30) Foreign Application Priority Data

Oct. 17, 2023 (JP) ................................ 2023-178641
Oct. 10, 2024 (JP) ................................ 2024-178353

(51) Int. Cl.
| | |
|---|---|
| *H04N 23/54* | (2023.01) |
| *G02F 1/1335* | (2006.01) |
| *G02F 1/13357* | (2006.01) |
| *G02F 1/1343* | (2006.01) |
| *G02F 1/1362* | (2006.01) |
| *G02F 1/1368* | (2006.01) |
| *H04N 23/20* | (2023.01) |
| *H04N 23/57* | (2023.01) |

(52) U.S. Cl.
CPC .. *G02F 1/133514* (2013.01); *G02F 1/133512* (2013.01); *G02F 1/133606* (2013.01); *G02F 1/133608* (2013.01); *G02F 1/134309*

(2013.01); *G02F 1/136286* (2013.01); *G02F 1/1368* (2013.01); *H04N 23/20* (2023.01); *H04N 23/54* (2023.01); *H04N 23/57* (2023.01)

(58) Field of Classification Search
USPC ......................................................... 348/164
See application file for complete search history.

(56) References Cited

U.S. PATENT DOCUMENTS

| | | | |
|---|---|---|---|
| 2003/0137631 A1 | 7/2003 | Nakayoshi et al. | |
| 2007/0235665 A1* | 10/2007 | Shamoun ............... | B82Y 40/00 |
| | | | 250/492.23 |
| 2007/0273797 A1* | 11/2007 | Silverstein ............. | H04N 9/315 |
| | | | 348/752 |

(Continued)

FOREIGN PATENT DOCUMENTS

| | | |
|---|---|---|
| JP | 2003-014917 A | 1/2003 |
| JP | 2003-215599 A | 7/2003 |

(Continued)

*Primary Examiner* — Nigar Chowdhury
(74) *Attorney, Agent, or Firm* — ScienBiziP, P.C.

(57) ABSTRACT

An image pickup apparatus equipped with a display function includes a liquid crystal panel, an infrared camera including a condenser lens and an imaging element, and a backlight disposed on a back face of the liquid crystal panel. The liquid crystal panel includes a display region including a first region and a second region located to surround the first region in a plan view, at least the imaging element of the infrared camera is disposed on a light path of light transmitted through the first region and the condenser lens, and the liquid crystal panel does not include a black matrix at least in the first region but includes color filters in the first and second regions.

10 Claims, 32 Drawing Sheets

(56)          References Cited

U.S. PATENT DOCUMENTS

| 2016/0054436 | A1* | 2/2016 | Lee | G09G 3/20 |
| | | | | 345/87 |
| 2019/0089880 | A1 | 3/2019 | Murao | |
| 2021/0141266 | A1 | 5/2021 | Takimoto et al. | |
| 2021/0263375 | A1 | 8/2021 | Hasegawa et al. | |
| 2022/0091316 | A1 | 3/2022 | Long et al. | |

FOREIGN PATENT DOCUMENTS

| JP | 2007-298547 | A | 11/2007 |
| JP | 2008-191262 | A | 8/2008 |
| JP | 2014-031140 | A | 2/2014 |
| JP | 2019-012156 | A | 1/2019 |
| JP | 2019-053227 | A | 4/2019 |
| JP | 2020-013068 | A | 1/2020 |
| JP | 2020-076921 | A | 5/2020 |
| JP | 2022-527426 | A | 6/2022 |
| WO | 2007/013272 | A1 | 2/2007 |

* cited by examiner

43B

41

43R

44

40 y
z   x

IMAGE PICKUP APPARATUS EQUIPPED WITH DISPLAY FUNCTION

BACKGROUND

1. Technical Field

The disclosure relates to an image pickup apparatus equipped with a display function.

2. Related Art

In order to assist safe driving of a vehicle such as an automobile or a train, studies have been carried out on capturing an image of a driver and analyzing a state of the driver from the captured image. In order to capture the image of the driver, it is preferable to dispose an image pickup apparatus on an instrument panel to which the face of the driver faces.

These days, information necessary for driving, such as information of a speedometer arranged in an instrument panel, is displayed on a plane display such as a liquid crystal display device. Thus, for example, JP 2014-031140 A discloses a display device in which a liquid crystal panel is disposed on an instrument panel and a camera is disposed on a back face of the liquid crystal panel.

SUMMARY

An object of the disclosure is to provide an image pickup apparatus equipped with a display function capable of acquiring a clear subject image.

An image pickup apparatus equipped with a display function according to an embodiment of the disclosure includes a liquid crystal panel, an infrared camera including a condenser lens and an imaging element, and a backlight disposed on a back face of the liquid crystal panel. The liquid crystal panel includes a display region including a first region and a second region located to surround the first region in a plan view. At least the imaging element of the infrared camera is disposed on a light path of light transmitted through the first region and the condenser lens. The liquid crystal panel does not include a black matrix at least in the first region but includes color filters in the first region and the second region.

According to an embodiment of the disclosure, there is provided an image pickup apparatus equipped with a display function capable of acquiring a clear subject image by an infrared camera disposed at a back face side of a liquid crystal panel.

DESCRIPTION OF EMBODIMENTS

A configuration in which an image pickup apparatus is disposed in the vicinity of a display device is achieved in smartphones, tablet terminals, notebook computers, and the like. However, in these devices, the position of the lens or lens window indicating the image pickup apparatus may be clearly recognized. Therefore, in a case where an instrument panel of an automobile is configured by adopting a similar structure, it is conceivable that a driver becomes aware of the presence of the image pickup apparatus every time the driver looks at the display of the liquid crystal panel, for example.

In order to make the position of the image pickup apparatus unnoticeable, a configuration in which a notch is provided on one side of the display device and the image pickup apparatus is disposed in a region within the notch is also employed in smartphones or the like. When an instrument panel of an automobile is configured by adopting a structure, the display region lacks a portion of the notch, whereby the display region does not have a rectangular shape. For this reason, it is conceivable that the aesthetic appearance of the instrument panel in the display state is impaired, or the driver recognizes that the image pickup apparatus is disposed in the notch portion where no image is displayed, and similarly, the driver becomes aware of the presence of the image pickup apparatus every time the driver looks at the display of the liquid crystal panel.

In view of the above-described problems, the inventor of the present patent application has studied a technique to dispose an image pickup apparatus in a display region where an image can be displayed. For example, it has been examined whether an infrared image can be acquired through a liquid crystal panel by disposing an image pickup apparatus for acquiring an image by infrared light at a central position of the liquid crystal panel.

Figure 1:
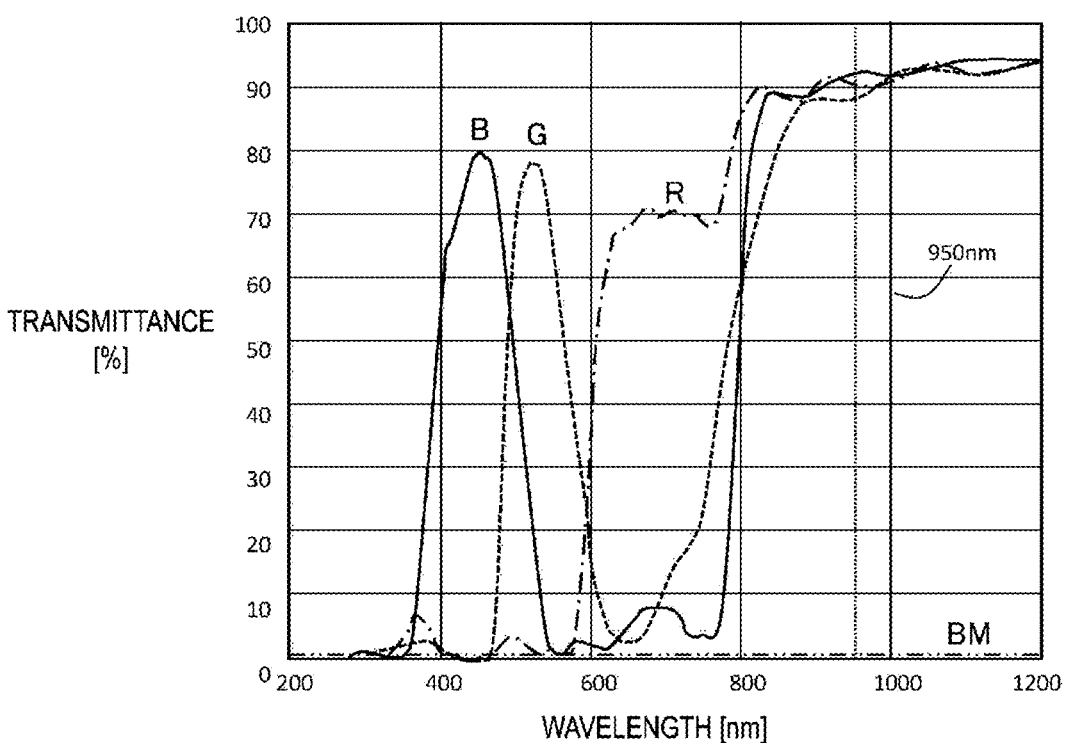
FIG. 1 depicts wavelength dependence of light transmittance of color filters and a black matrix used in a general liquid crystal panel.

FIG. 1 depicts wavelength dependence of light transmittance of color filters used in a general liquid crystal panel. As depicted in FIG. 1, blue (B), green (G), and red (R) filters (monochromatic filters) have optical characteristics for selectively transmitting light in the blue, green, and red wavelength bands, respectively, in the visible region. On the other hand, the blue, green, and red filters transmit light having a wavelength longer than the wavelength in the visible region without absorbing the light. For example, the transmittance of each filter is approximately 90% with respect to infrared light having a wavelength of 950 nm. On the other hand, the transmittance of a black matrix (BM) disposed in a boundary region of the color filters is approximately 0.1% with respect to any of the visible light and infrared light.

It is known that a polarizer and a liquid crystal layer have little optical influence on infrared light. Therefore, when infrared light is used as illumination light and an image is acquired by an image pickup apparatus via a liquid crystal panel provided with color filters, it is considered that the image can be acquired with almost no difference in transmittance between the blue, green, and red filter regions.

Figure 2:
FIG. 2 shows an example where a subject image transmitted through a liquid crystal panel is acquired using infrared light as illumination light.

FIG. 2 shows an example where a subject image transmitted through a liquid crystal panel is acquired using infrared light as illumination light. As shown in FIG. 2, although an image is acquired, the image is not clear; instead, a multiple image is acquired. In particular, an image blur in a horizontal direction is larger than that in a vertical direction. It is conceivable that the occurrence of the above problem is due to the influence of the black matrix of the liquid crystal panel.

Figure 3:
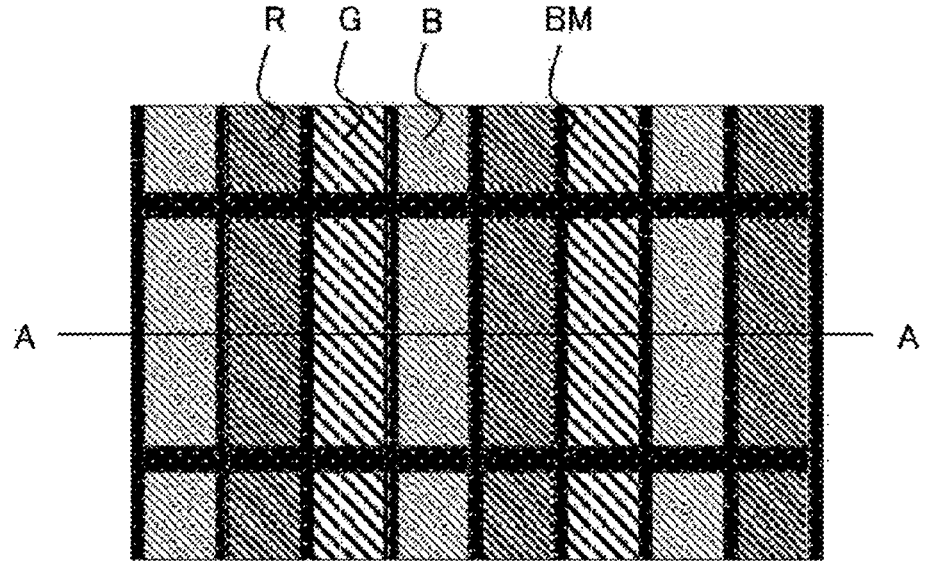
FIG. 3 illustrates a schematic plan view of color filters and a black matrix of a liquid crystal panel, and depicts transmittance of red light, green light, blue light, and infrared light at an A-A line.
Figure 3:
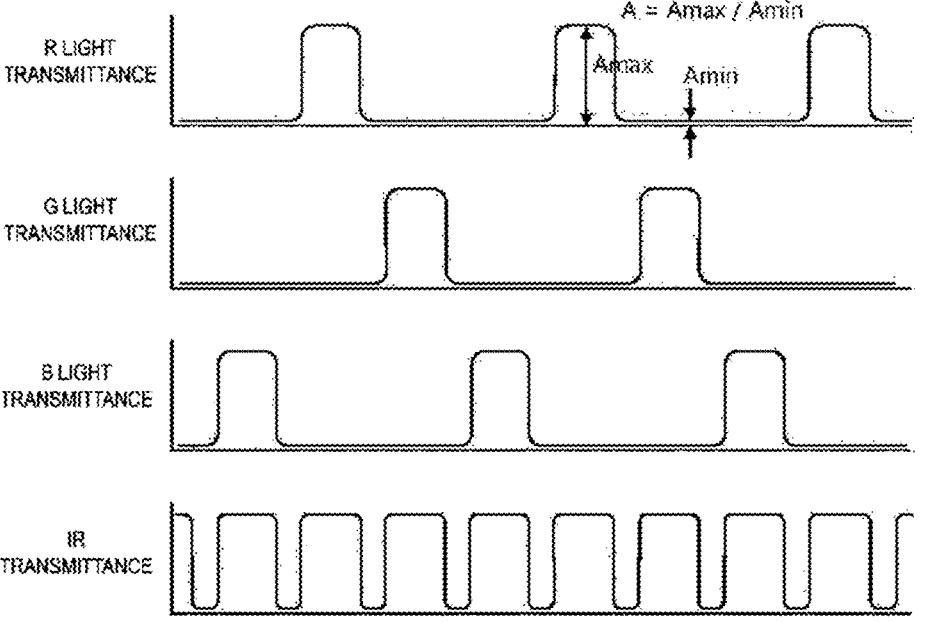

FIG. 3 is a schematic plan view of the color filters and the black matrix of the liquid crystal panel. The transmittance of each of red light, green light, blue light, and infrared light at the A-A line is depicted below the plan view. In the filter region of each color of RGB, light of each corresponding wavelength band is selectively transmitted. For example, the red light is selectively transmitted only through the red filter region, and is mostly absorbed in the green and blue filter regions. The same applies to the green light and the blue light. Because of this, a transmission region in a direction of the A-A line is repeated at the same period for each of the red light, green light, and blue light.

On the other hand, the infrared light is transmitted to the same extent regardless of the colors of the filters as described above. However, the transmittance of the black matrix with respect to the infrared light having a wavelength of 950 nm is approximately 0.1%, so that most of the infrared light is blocked.

The regions through which the red light, the green light, the blue light, and the infrared light pass correspond to slits of a diffraction lattice, and the color filters and the black matrix function as the diffraction lattice for the red light, the green light, the blue light, and the infrared light. A value three times a pixel pitch in the A-A line direction is a slit interval for the red light, the green light and the blue light, and the value of the pixel pitch is a slit interval for the infrared light. Assuming that the slit interval is d and the wavelength of light is $\lambda$, an interval D between the positions at which diffraction images are formed by the light intensifying each other at the diffraction lattice is approximately represented by an expression of $D \propto \lambda/d$.

Brightness of the generated diffraction image depends on a ratio A of a maximum transmittance Amax to a minimum transmittance Amin, which is represented by an expression of A=Amax/Amin.

Figure 4:
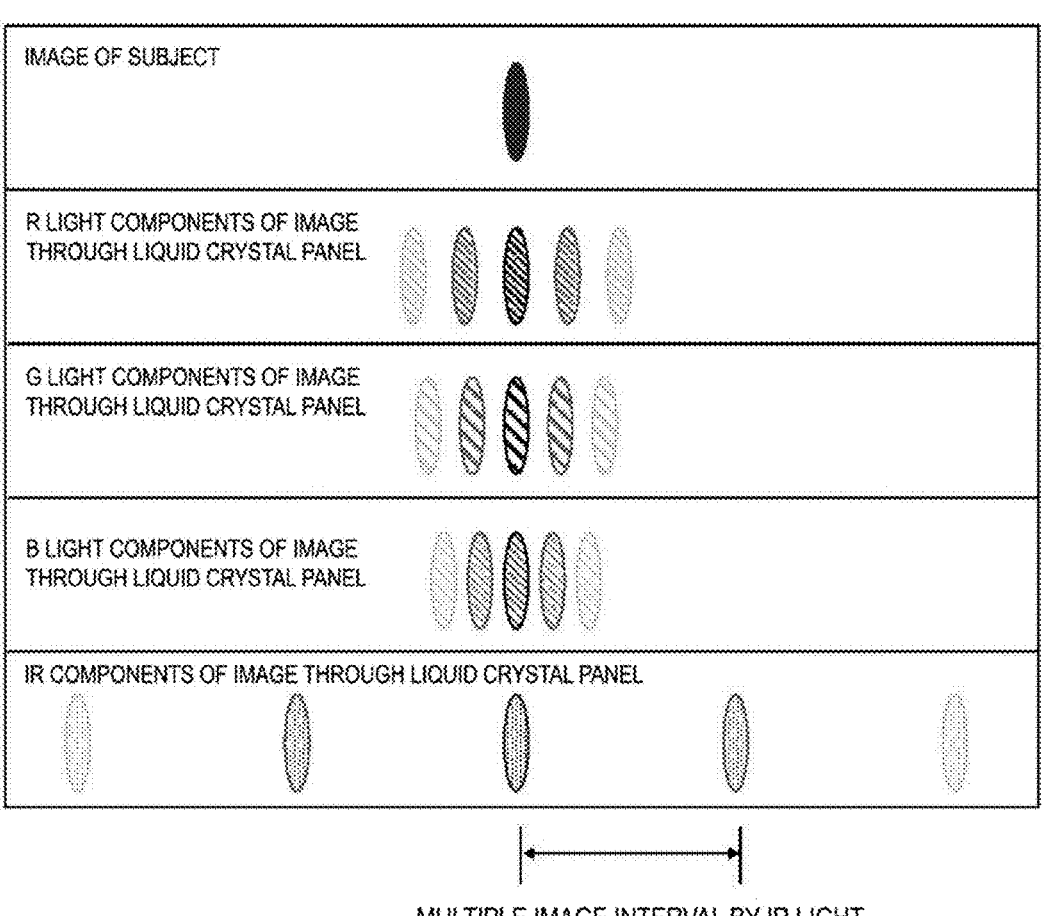
FIG. 4 is a schematic diagram depicting generation of diffraction images by red light, green light, blue light, and infrared light.

FIG. 4 is a schematic diagram depicting the generation of diffraction images by red light, green light, blue light, and infrared light. With respect to an image of a subject, images by red light, green light, blue light, and infrared light include diffraction images of ±first order, ±second order, ±third order, and so forth. As described above, the interval D between the diffraction images is proportional to the wavelength $\lambda$ and is inversely proportional to the slit interval d.

Accordingly, regarding the diffraction images by the red light, the green light, and the blue light, the slit intervals are equal but the wavelengths are different, and therefore the interval between the blue diffraction images is shortest. On the other hand, regarding the infrared light, the slit interval d is one-third that of the red light or the like and the wavelength is longer, and therefore the interval between the diffraction images by the infrared light is three times or more the interval between the diffraction images by the red light, the green light, and the blue light. As a result, it is conceivable that the diffraction images are recognized as a multiple image when infrared light is used for imaging.

Each pixel is longer in the y-axis direction than in the x-axis direction in which the blue, green, and red filters are arrayed. That is, the pixel pitch is shorter in the x-axis direction. Because of this, as shown in FIG. 2, it is conceivable that blurring of the image in the x-axis direction becomes larger than that in the y-axis direction.

The inventor of the present patent application has contrived an image pickup apparatus equipped with a display function based on the above-discussed study results. An image pickup apparatus equipped with a display function according to the disclosure can capture an image of a subject in front of a display device, that is, a subject facing a display region. The image pickup apparatus equipped with a display function may be referred to as an electronic apparatus provided with an image pickup apparatus and a display device, or may be referred to as a display device equipped with an image pickup apparatus.

Such image pickup apparatus equipped with a display function is mounted on an instrument panel of an automobile, and can be suitably used for capturing an image of the upper half of the body, particularly the face of the driver. In addition to the automobile, the apparatus is suitably used for capturing an image of a driver, a pilot, or the like of a vehicle such as a train, an airplane, or the like. Further, as will be described later, the image pickup apparatus equipped with a display function of the disclosure can capture an image from a region within the display region. Thus, for example, in a case where the image pickup apparatus equipped with a display function of the disclosure is employed as a display of a notebook computer, a tablet terminal, or a smartphone, it is possible to capture an image from the vicinity of a position of the eye of the face displayed on the display. Accordingly, in a case where a Web conference is held, it is possible to obtain an image at a more natural angle of each participant in the Web conference through the display, that is, possible to obtain a direction of a line of sight as if the participants in the Web conference are each looking at the faces and eyes of the participants, as compared to a case where a camera is disposed in a frame region in the known art.

The image pickup apparatus equipped with a display function of the disclosure will be described below with reference to the drawings. The disclosure is not limited to the following embodiments, and appropriate design changes can be made within a scope that satisfies the configuration of the disclosure. Further, in the description below, the same reference signs may be used in common among the different drawings for the same portions or portions having the same or similar functions, and descriptions of repetitions thereof may be omitted. Further, the configurations described in the embodiments and the modified examples may be combined or modified as appropriate within a range that does not depart from the gist of the disclosure. For ease of explanation, in the drawings referenced below, configurations may be simplified or schematically illustrated, or a portion of the components may be omitted. Further, dimensional ratios between components illustrated in the drawings are not necessarily indicative of actual dimensional ratios.

First Embodiment

Figure 5:
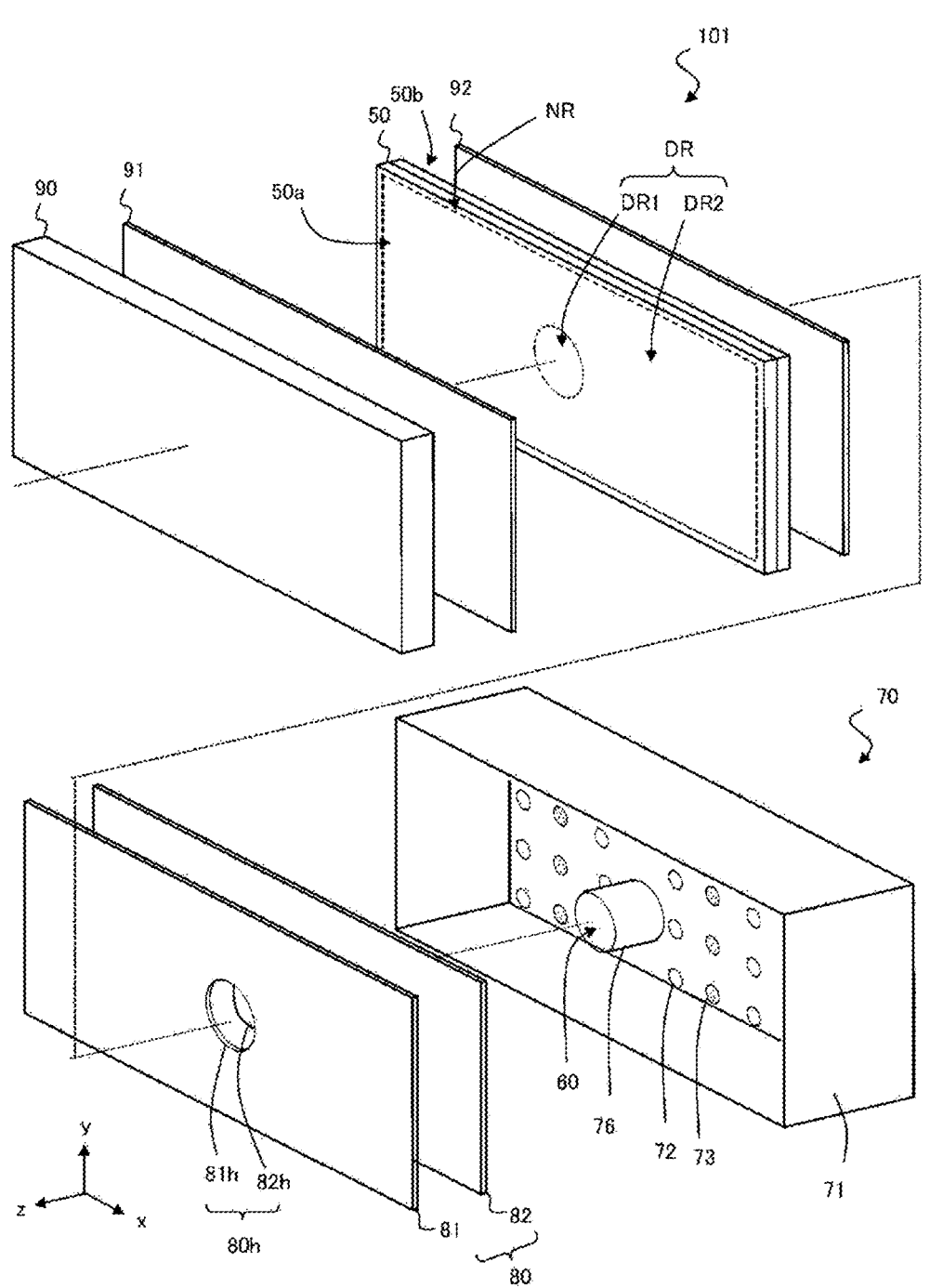
FIG. 5 is an exploded perspective view illustrating a schematic configuration of an image pickup apparatus equipped with a display function according to a first embodiment.
Figure 6:
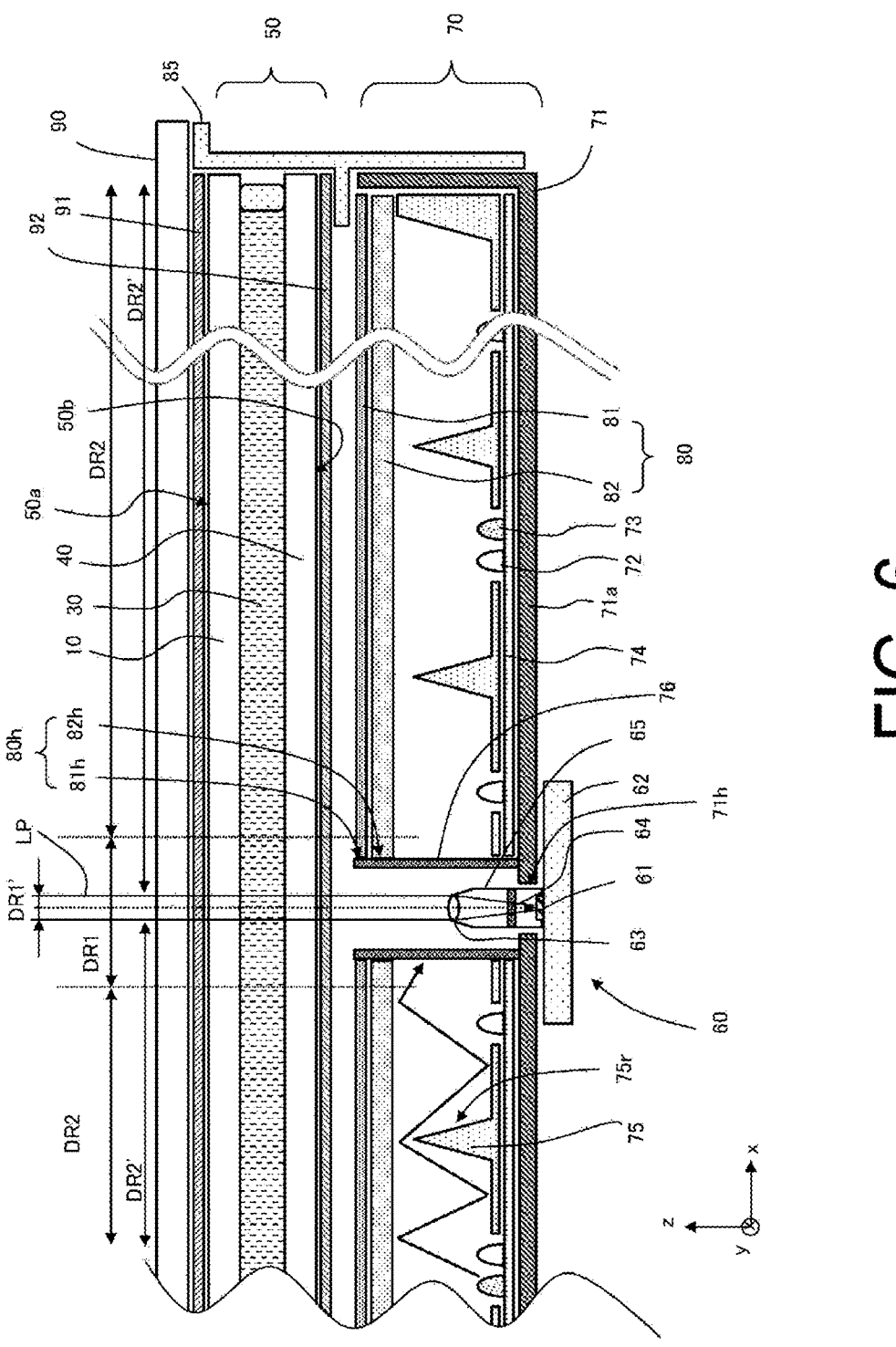
FIG. 6 is a schematic cross-sectional view of main portions of the image pickup apparatus equipped with a display function illustrated in FIG. 5.

FIG. 5 is an exploded perspective view illustrating a schematic configuration of an image pickup apparatus equipped with a display function according to the present embodiment, and FIG. 6 is a schematic cross-sectional view of main portions of an image pickup apparatus equipped with a display function of the present embodiment.

An image pickup apparatus equipped with a display function 101 includes a liquid crystal panel 50, an infrared camera 60, and a backlight 70. The image pickup apparatus equipped with a display function 101 further includes a cover glass 90, a first polarizer 91, a second polarizer 92, and an optical structure 80. The liquid crystal panel 50, the backlight 70, the first polarizer 91, the second polarizer 92, and the optical structure 80 constitute a display device.

The liquid crystal panel 50 has a front face 50a and a back face 50b. The front face 50a includes a display region DR, and a non-display region NR surrounding the display region DR and located on a periphery of the display region DR. The display region DR is a region where an image is displayed, and the non-display region NR is a region where an image is not displayed because a drive circuit, a wiring line, and the like are provided.

The display region DR includes a first region DR1 and a second region DR2. The first region DR1 is surrounded by the second region DR2. The first region DR1 is preferably disposed close to the center of the display region DR, and is preferably disposed close to the center away from the outer edge of the display region DR. The second region DR2 is a region other than the first region DR1 in the display region DR, and the outer edge of the first region DR1 is in contact with the inner edge of the second region DR2. The first region DR1 and the second region DR2 are regions defined on the front face 50a and are also continuously defined in a thickness direction of the liquid crystal panel 50. In other words, the first region DR1 and the second region DR2 are defined also on the back face 50b; the first region DR1 and the second region DR2 on the front face 50a and the first region DR1 and the second region DR2 on the back face 50b overlap each other in a plan view.

The first region DR1 has, for example, a circular shape having a diameter in a range from about 5 mm to about 2 cm. The shape of the first region DR1 is not limited to a circle, and may be an ellipse, an oval, a rectangle, or a polygon.

As described in detail below, the liquid crystal panel 50 is configured to be capable of displaying an image in the entire display region DR. That is, a color image can be displayed in the first region DR1 and the second region DR2. To be more specific, pixels are formed in the first region DR1 and the second region DR2 of the liquid crystal panel 50, and color filters are disposed therein. The liquid crystal panel 50 does not have a black matrix in the first region DR1. In other words, the black matrix is disposed only in the second region DR2 and is not disposed in the first region DR1.

The first polarizer 91 and the second polarizer 92 are disposed on the front face 50a and the back face 50b, respectively, of the liquid crystal panel 50. The first polarizer 91 and the second polarizer 92 respectively cover the first region DR1 and the second region DR2, and overlap each other. Since the first polarizer 91 and the second polarizer 92 are also disposed in the first region DR1, an image similar to that in the second region DR2 can be displayed in the first region DR1 as well. It is unnecessary to process the first polarizer 91 and the second polarizer 92, and thus the manufacturing cost may be reduced. The first polarizer 91 and the second polarizer 92 are arranged in a crossed-Nicol relationship.

The cover glass 90 is disposed on the first polarizer 91 to protect the liquid crystal panel 50. The backlight 70 is disposed at the outer side of the second polarizer 92 with the optical structure 80 interposed therebetween.

The optical structure 80 increases the uniformity of light emitted from the backlight 70 and also increases the brightness by adjusting the traveling direction of light so that the light is incident on the liquid crystal panel 50 in a direction perpendicular thereto. For example, the optical structure 80 includes a diffuser plate 82 and a brightness enhancement film 81 such as Brightness Enhancement Film (BEF). FIG. 5 indicates that only these two constituent elements are included in the optical structure 80, but the optical structure 80 may further include other plate-shaped or film-shaped optical elements. The optical structure 80 has an optical structure through-hole 80h in a region overlapping the first region DR1. In the present embodiment, a through-hole 81h and a through-hole 82h are provided in a region of the brightness enhancement film 81 and a region of the diffuser plate 82 overlapping the first region DR1, respectively.

Figure 7:
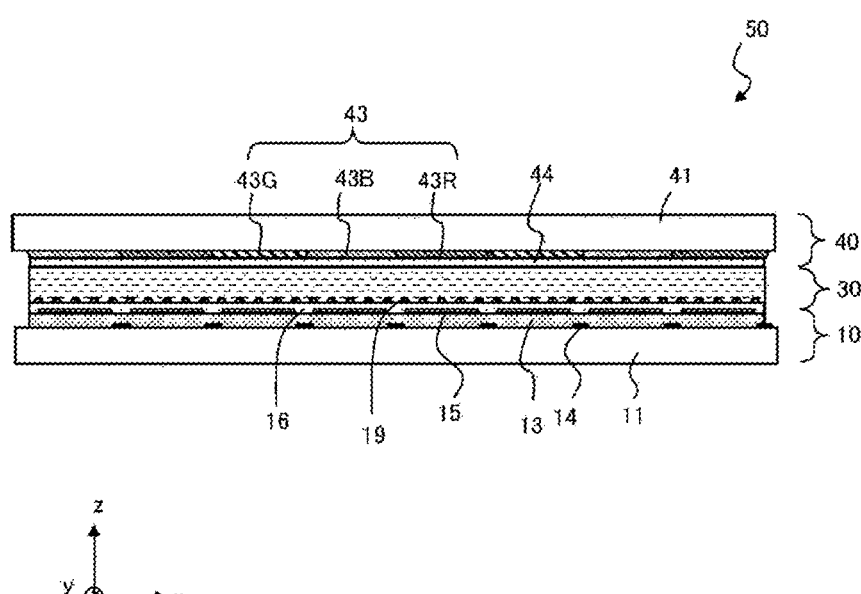
FIG. 7 is a schematic cross-sectional view in an x-axis direction in a first region of a liquid crystal panel.
Figure 8:
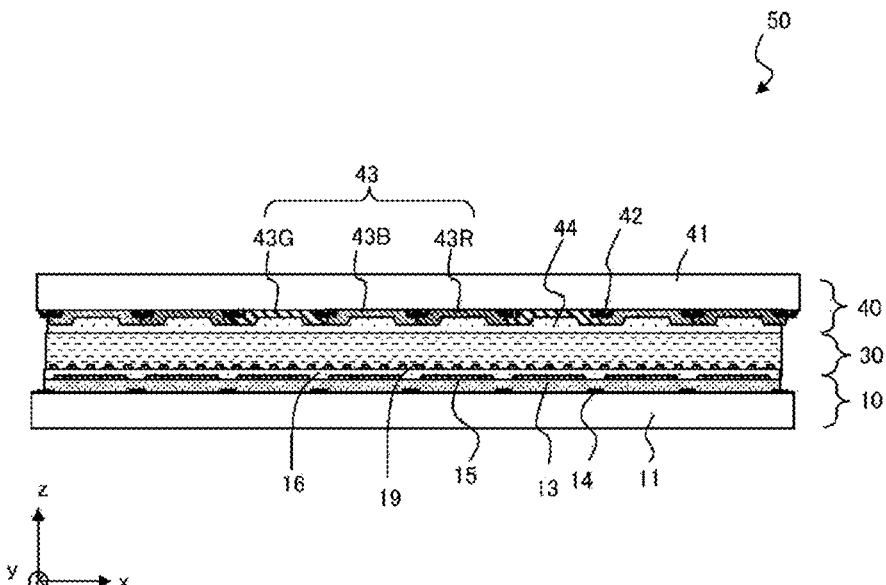
FIG. 8 is a schematic cross-sectional view in the x-axis direction in a second region of the liquid crystal panel.
Figure 9:
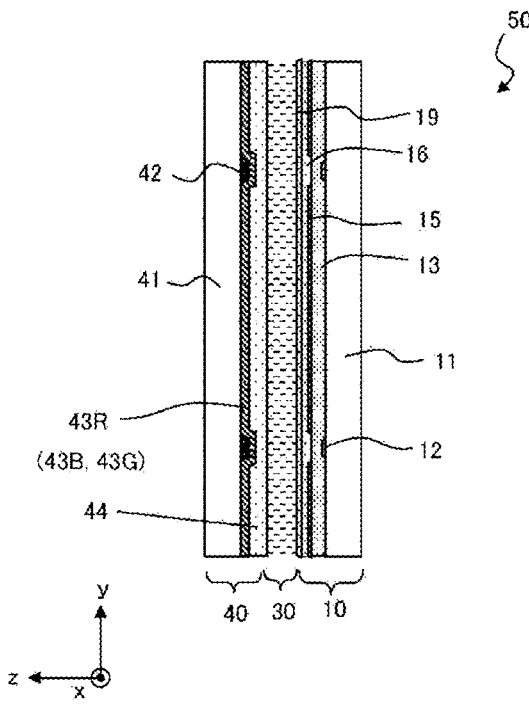
FIG. 9 is a schematic cross-sectional view in a y-axis direction in the second region.
Figure 10:
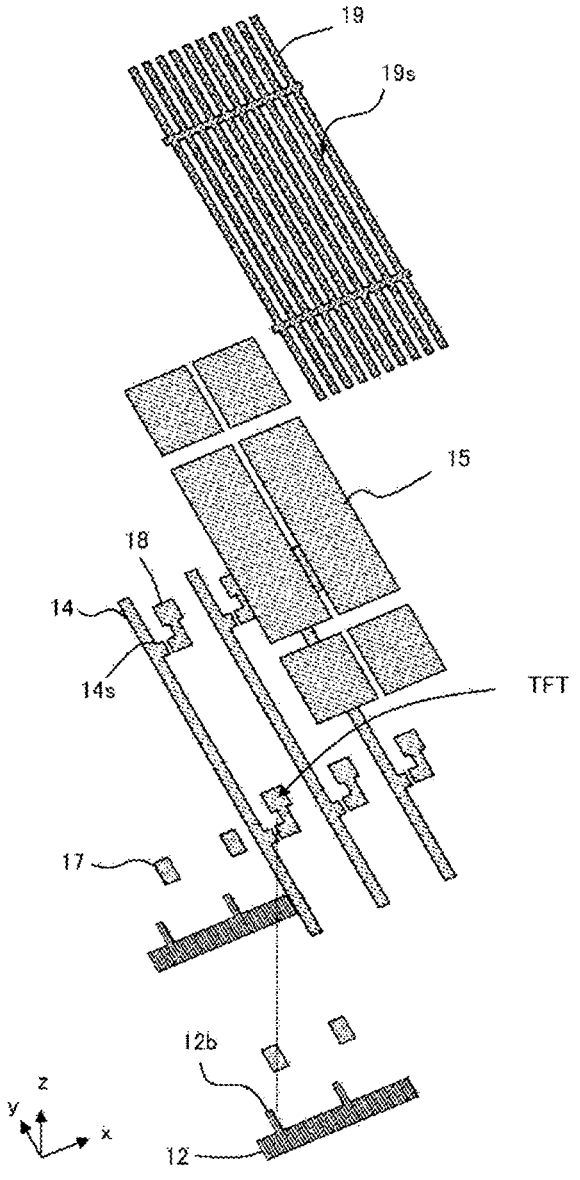
FIG. 10 is a schematic exploded perspective view of main constituent elements of the liquid crystal panel.
Figure 11:
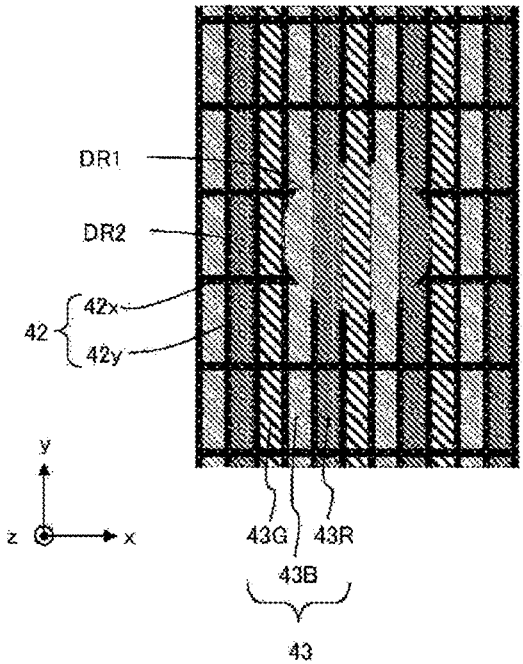
FIG. 11 is a plan view of color filters and a black matrix.

Next, the structure of the liquid crystal panel 50 will be described in detail. The liquid crystal panel 50 may be a liquid crystal panel of various driving methods, and has a feature of not having a black matrix in the first region DR1. FIGS. 7 and 8 are schematic cross-sectional views in the x-axis direction in the first region and the second region of the liquid crystal panel 50, and FIG. 9 is a schematic cross-sectional view in the y-axis direction in the second region thereof. FIG. 10 illustrates a schematic exploded perspective view of main constituent elements of the liquid crystal panel 50. FIG. 11 is a plan view of color filters and a black matrix.

The liquid crystal panel 50 includes a TFT substrate 10, a counter substrate 40, and a liquid crystal layer 30 disposed between the TFT substrate 10 and the counter substrate 40.

The TFT substrate 10 has the same structure in the first region DR1 and the second region DR2. That is, the liquid crystal panel 50 has the same driving structure in the first region DR1 and the second region DR2. Specifically, the TFT substrate 10 includes a substrate 11, a plurality of scanning lines 12, an insulating layer 13, a plurality of data lines 14, a plurality of pixel electrodes 15, a plurality of TFTs, an insulating layer 16, and a counter electrode 19. Each TFT includes a gate electrode 12b, a semiconductor layer 17, a source electrode 14s, and a drain electrode 18. The scanning line 12, the data line 14, the gate electrode 12b, the source electrode 14s, and the drain electrode 18 are made of, for example, metals that do not substantially transmit any of visible light and infrared light. The pixel electrode 15 and the counter electrode 19 are made of a transparent conductor, such as ITO, that transmits visible light and infrared light.

The substrate 11 is constituted of glass or the like that transmits visible light and infrared light. An undercoat layer or the like may be provided on a surface of the substrate 11. The plurality of scanning lines 12 extend in the x-axis direction and are arrayed in the y-axis direction on the substrate 11. The gate electrode 12b of each TFT is connected to the scanning line 12.

A gate insulating film constituting part of the insulating layer 13 is formed on the substrate 11 to cover the plurality of scanning lines 12 and the gate electrodes 12b. The semiconductor layer 17 is located on the gate insulating film to overlap the gate electrodes 12b in a plan view.

The plurality of data lines 14 extend in the y-axis direction and are arrayed in the x-axis direction on the gate insulating film. One end of the source electrode 14s of each TFT is connected to the data line 14. The other end of the source electrode 12s is connected to the semiconductor layer 17.

The drain electrode 18 is disposed separate in the x-axis direction from the source electrode 14s with the gate electrode 12b interposed therebetween, and one end of the drain electrode 18 is connected to the semiconductor layer 17.

An insulating film constituting part of the insulating layer 13 is formed on the gate insulating film to cover the data line 14, the semiconductor layer 17, and the drain electrode 18.

The plurality of pixel electrodes 15 are two-dimensionally arrayed in the x-axis direction and the y-axis direction on the insulating film. Each pixel electrode is connected to the other end of the drain electrode via a contact hole provided in the insulating film.

The insulating layer 16 is formed on the insulating layer 13 to cover the pixel electrode 15. The counter electrode 19 is formed on the insulating layer 16. For example, a plurality of slits 19s extending in the y-axis direction are formed in the counter electrode.

A region surrounded by a pair of scanning lines 12 and a pair of data lines 14 constitutes a pixel, and each pixel includes a TFT serving as a switching element and the pixel electrode 15.

As described above, the TFT substrate 10 has the same structure in the first region DR1 and the second region DR2. That is, the plurality of scanning lines 12, the plurality of data lines 14, the plurality of TFTs, and the plurality of pixel electrodes 15 are respectively located in the first region DR1 and the second region DR2 of the liquid crystal panel 50. In order to secure a sufficient amount of light incident on the imaging element, the first region DR1 preferably has a size in which eight or more of the plurality of scanning lines 12, eight or more of the plurality of data lines 14, eight or more of the plurality of TFTs, and eight or more of the plurality of pixel electrodes 15 are disposed.

An array pitch of these constituent elements is preferably substantially the same in the first region DR1 and the second region DR2. To be specific, the interval between the adjacent scanning lines 12 in the first region DR1 is preferably in a range of 0.5 times or more and 1.5 times or less the interval between the adjacent scanning lines 12 in the second region DR2. The interval between the adjacent data lines 14 in the first region DR1 is preferably in a range of 0.5 times or more and 1.5 times or less the interval between the adjacent data lines 14 in the second region DR2. The interval between the adjacent TFTs in the first region DR1 is preferably in a range of 0.5 times or more and 1.5 times or less the interval between the adjacent TFTs in the second region DR2. The interval between the adjacent pixel electrodes 15 in the first region DR1 is preferably in a range of 0.5 times or more and 1.5 times or less the interval between the adjacent pixel electrodes 15 in the second region DR2. An area of the pixel electrode 15 in the first region DR1 is preferably in a range of 0.5 times or more and 1.5 times or less an area of the pixel electrode 15 in the second region DR2.

By satisfying the above-discussed relationship, one integral still picture or moving picture can be displayed in the first region DR1 and the second region DR2 without performing special image processing in the first region DR1 and the second region DR2.

The counter substrate 40 includes a substrate 41, a black matrix 42 and a color filter 43, and in the first region DR1, has a structure different from that in the second region DR2. Specifically, the counter substrate 40 does not include the black matrix 42 in the first region, but includes the black matrix in the second region. The counter substrate 40 further includes an overcoat layer 44 covering the color filter 43.

The substrate 41 is constituted of glass or the like that transmits visible light and infrared light. The black matrix 42 is formed in the second region DR2 of the substrate 41. The black matrix 42 is constituted of, for example, a material with the transmittance of visible light and infrared light being 30% or less, preferably 1% or less. The black matrix 42 is located at a boundary portion of each pixel, and includes a portion 42x extending in the x-axis direction and a portion 42y extending in the y-axis direction. As described above, the black matrix 42 is not formed in the first region DR1 of the substrate 41.

The color filter 43 includes a red filter 43R, a green filter 43G, and a blue filter 43B, and is disposed on the substrate 41. To be more specific, any of the red filter 43R, the blue filter 43B, and the green filter 43G is disposed for each pixel. As illustrated in FIG. 11, the red filter 43R, the green filter 43G, and the blue filter 43B are repeatedly arrayed in the x-axis direction.

On the other hand, filters of the same color are arrayed in the y-axis direction. Thus, as illustrated in FIG. 9, the red filter 43R, the green filter 43G, and the blue filter 43B may be each continuously arrayed in the y-axis direction.

As described above, since the black matrix 42 is disposed in the second region DR2, a boundary between the color filter 43 of each pixel and the color filter of an adjacent pixel is located on the black matrix 42. Due to this, the black matrix 42 suppresses the occurrence of color mixture of two colors selected from red, blue, and green colors between adjacent pixels. In the second region DR2, the color filters 43 between a pair of pixels adjacent to each other may be in contact with each other or may be separated from each other by a distance smaller than the width of the black matrix.

In contrast, in the first region DR1, the color filter of each pixel is preferably in contact with the color filter of an adjacent pixel. With this, at the boundary of each pixel in the first region DR1 in which the black matrix 42 is not formed therein, it is possible without the black matrix to suppress the generation of light that is emitted without passing through the color filter, so that a correct color image can be displayed.

When the image pickup apparatus equipped with a display function according to the present embodiment is used for an instrument panel of an automobile, the driver watches the liquid crystal panel 50 carefully from the front. Therefore, as compared with a case where the liquid crystal panel is viewed from an oblique direction, color mixing between pixels is unlikely to occur, and a large difference in display quality between the images displayed in the first region DR1 and the second region DR2 is unlikely to occur even when the black matrix is not disposed in the first region DR1.

In the present embodiment, the color filter of each pixel does not overlap part of the color filter of an adjacent pixel. However, due to manufacturing errors or the like, the color filters of some pixels may overlap part of the color filters of the adjacent pixels in the first region DR1. A structure that positively utilizes the overlapping of the color filters will be described as a next embodiment.

The backlight 70 is fixed at a predetermined position with respect to the liquid crystal panel 50 by a housing 85. In the present embodiment, the backlight 70 is of a direct type, and causes white light to enter the liquid crystal panel 50 via the optical structure 80. The backlight 70 includes a chassis 71 having a base 71a facing the liquid crystal panel, and a plurality of display light-emitting elements 72 disposed on the base 71a. The plurality of display light-emitting elements 72 are mounted on a mounting substrate 74 disposed at the inner side of the base 71a. The plurality of display light-emitting elements 72 may be driven for each element or each area by local dimming. The display light-emitting element 72 emits, for example, white light. Alternatively, the display light-emitting element 72 may emit blue light or ultraviolet light. In this case, the backlight 70 may further include a wavelength conversion member covering the display light-emitting elements 72 or a wavelength conversion sheet provided above the plurality of display light-emitting elements 72. With this configuration, the light emitted from the display light-emitting elements 72 may be converted into yellow light or white light to be emitted from the backlight 70, and the white light may enter the optical structure 80.

The backlight 70 further includes at least one infrared light-emitting element 73 mounted on the mounting substrate 74 of the base 71a. The infrared light-emitting element 73 emits infrared light. The emitted infrared light passes through the liquid crystal panel 50 and illuminates the subject (driver).

The backlight 70 may further include a partition structure 75 disposed on the mounting substrate 74. The partition structure 75 has a plurality of reflective surfaces 75r, and partitions the base 71a into regions each including one or more display light-emitting elements 72, for example. The reflective surface 75r suppresses a situation in which the light emitted from the display light-emitting elements 72 spreads in a lateral direction, whereby the brightness of the light emitted from the backlight 70 is increased. When the backlight 70 is driven by local dimming, the contrast near a boundary between a lighted section and an unlighted section is increased.

It is preferable that at least one of the reflective surfaces 75r be located between a condenser lens 63 of the infrared camera 60 described later and an infrared light-emitting element 73. This makes it possible to suppress a situation in which infrared light emitted from the infrared light-emitting element 73 directly enters the infrared camera 60.

The infrared camera 60 includes an imaging element 61, and is disposed facing the liquid crystal panel 50 in such a manner that the imaging element 61 is located on a light path LP of light coming from the outside to pass through the first region DR1 of the liquid crystal panel 50. In the present embodiment, the light path LP is configured to be linear without being bent by a reflector or the like. Thus, the infrared camera 60 is disposed at the back face side of the liquid crystal panel 50.

Specifically, the infrared camera 60 includes a circuit substrate 62 provided with a drive circuit of the imaging element 61, and the imaging element 61 is mounted on the circuit substrate 62. The chassis 71 of the backlight 70 has a chassis through-hole 71h in a region overlapping the first region DR1 of the base 71a, and the circuit substrate 62 is disposed at the outer side of the chassis 71 in such a manner that the imaging element 61 is located within the chassis through-hole 71h. By disposing the circuit substrate 62 outside the chassis 71, an increase in height of the chassis 71 can be suppressed, and a decrease in in-plane uniformity of the backlight can be suppressed.

The infrared camera 60 preferably further includes the condenser lens 63, an infrared transmission filter 64, and a lens-barrel 65. The lens-barrel 65 is attached to the circuit substrate 62 while surrounding the imaging element 61, and is inserted into the chassis through-hole 71h. The condenser lens is supported at one end of the lens-barrel 65, and the infrared transmission filter 64 is supported by the lens-barrel 65 between the condenser lens 63 and the imaging element 61. The condenser lens 63 condenses light coming from the outside and passing through the light path LP, onto the imaging element 61.

Since the lens-barrel 65 is inserted into the chassis through-hole 71*h*, the condenser lens 63 is disposed between the base 71*a* of the chassis 71 and the liquid crystal panel 50. With this configuration, the condenser lens 63 can be brought close to the liquid crystal panel 50, and the first region DR1 can be made small.

The area of the first region DR1 is preferably equal to or larger than the opening area of the condenser lens 63. The opening area of the optical structure through-hole 80*h* is preferably equal to or larger than the opening area of the condenser lens 63. This makes it possible to suppress missing of the field of view of the infrared camera 60.

The opening area of the optical structure through-hole 80*h* is preferably equal to or smaller than the area of the first region DR1. More preferably, the opening area of the optical structure through-hole 80*h* is equal to or larger than the opening area of the condenser lens 63, and the opening area of the optical structure through-hole 80*h* is equal to or smaller than the area of the first region DR1. By satisfying such relationship, it is possible to further suppress the missing of the field of view of the infrared camera 60.

The infrared transmission filter 64 absorbs visible light and selectively transmits infrared light. For example, the infrared transmission filter 64 has higher spectral characteristics in the transmittance at a wavelength of 920 nm than in the transmittance at a wavelength of 550 nm. By disposing the infrared transmission filter 64 having the above-described spectral characteristics between the condenser lens 63 and the imaging element 61, stray light of visible light can be efficiently suppressed, and an image of the driver obtained by illumination with infrared light can be more clearly acquired.

The backlight 70 may further include a shading body 76 having a pillar shape, disposed in the chassis 71 to surround the light path LP, and configured to block infrared light. When the infrared camera 60 includes the lens-barrel 65, the shading body 76 preferably surrounds the lens-barrel 65.

The shading body 76 preferably transmits visible light and absorbs infrared light. For example, it is preferable for the shading body 76 to have spectral characteristics in which the transmittance at a wavelength of 920 nm is equal to or smaller than the transmittance at a wavelength of 550 nm. With the provision of the shading body 76, it is possible to suppress a situation in which infrared light emitted from the infrared light-emitting element 73 of the backlight 70 directly enters the infrared camera 60, and blown out highlights can be suppressed, thereby making it possible to acquire the image of the driver more clearly. Further, by transmitting visible light, it is possible to cause light emitted from the display light-emitting element 72 to enter the light path LP even when the shading body 76 is provided. With this, the light of the backlight 70 can also enter the first region of the liquid crystal panel 50, and thus a decrease in brightness of the liquid crystal panel 50 in the first region can be suppressed. That is, when an image on the display device is viewed from the outside, a difference in display quality between the first region DR1 and the second region DR2 can be suppressed.

In the image pickup apparatus equipped with a display function of the present embodiment, the liquid crystal panel is driven by the FFS method. Thus, the liquid crystal panel 50 operates in the normally black mode.

According to the image pickup apparatus equipped with a display function of the present embodiment, since the black matrix is not provided in the first region, the influence of the diffraction image of the image is suppressed, and a clear infrared image can be acquired. Further, the second region is located to surround the first region, and an image can be displayed in the first region and the second region. That is, since an infrared camera can be disposed on the back face of the liquid crystal panel, a region in which the camera is disposed, that is, a camera hole, is unlikely to be visually recognized by the driver. This makes it possible to suppress a situation in which the driver recognizes the camera hole during driving and feels a psychological burden, and to monitor the state of the driver while providing a comfortable driving environment to the driver.

In the image pickup apparatus equipped with a display function of the present embodiment, the liquid crystal panel is driven by the FFS method. Thus, the liquid crystal panel operates in the normally black mode. That is, a portion to which a voltage for driving the liquid crystal is not applied, such as a portion between pixels, is displayed in black. Therefore, even when the black matrix is not formed in the first region, the influence of light leakage in black display is reduced.

In the present embodiment, the image pickup apparatus equipped with a display function includes the black matrix in the second region DR2, but may be allowed not to include the black matrix in the second region DR2 as well. In this case, the counter substrate of the image pickup apparatus equipped with a display function has the cross-sectional structure illustrated in FIG. 7 in the second region as well. In other words, the counter substrate has the same structure in the first region DR1 and the second region DR2.

In this case, as illustrated in FIG. 6, a first region DR1' is defined by a region overlapping the condenser lens 63 of the infrared camera 60 in a plan view. The first region DR1' is surrounded by the second region DR2'. The second region DR2' is a region other than the first region DR1' in the display region DR, and the outer edge of the first region DR1' is in contact with the inner edge of the second region DR2'. The first region DR1' and the second region DR2' are regions defined on the front face 50*a* and are also continuously defined in the thickness direction of the liquid crystal panel 50. In order to secure a sufficient amount of light incident on the imaging element, the first region DR1' preferably has a size in which eight or more of the plurality of scanning lines 12, eight or more of the plurality of data lines 14, eight or more of the plurality of TFTs, and eight or more of the plurality of pixel electrodes 15 are disposed.

In this case, the area of the first region DR1' is equal to the opening area of the condenser lens 63. The opening area of the optical structure through-hole 80*h* is preferably equal to or larger than the opening area of the condenser lens 63. This makes it possible to suppress missing of the field of view of the infrared camera 60. The opening area of the optical structure through-hole 80*h* is preferably equal to or larger than the area of the first region DR1'.

Even when the black matrix is not provided in the second region DR2', the influence of the diffraction image of the image is suppressed and a clear infrared image can be acquired, as described above. In addition, the camera hole is unlikely to be visually recognized. In particular, according to this aspect, since there is no difference in the structure of the liquid crystal panel 50 between the first region DR1' and the second region DR2', the camera hole is more unlikely to be visually recognized.

Further, since the liquid crystal panel does not have a black matrix in the entire display region DR, the first region DR1' can be set at any position. In other words, when light transmitted through any position in the display region DR is detected by the imaging element, a clear image can be acquired. Therefore, the number and positions of infrared cameras can be optionally changed by using the same liquid crystal panel.

As for the color filters, the color filter of each pixel is preferably in contact with the color filter of an adjacent pixel in a region of 90% or more of the display region DR including the entire first region DR1 and at least part of the second region DR2. Since a black matrix is not formed in the first region DR1 and the second region DR2, by satisfying such a feature, leakage of light that does not pass through the color filter is suppressed, and the image pickup apparatus equipped with a display function can display a high-quality color image.

Second Embodiment

Figure 12:
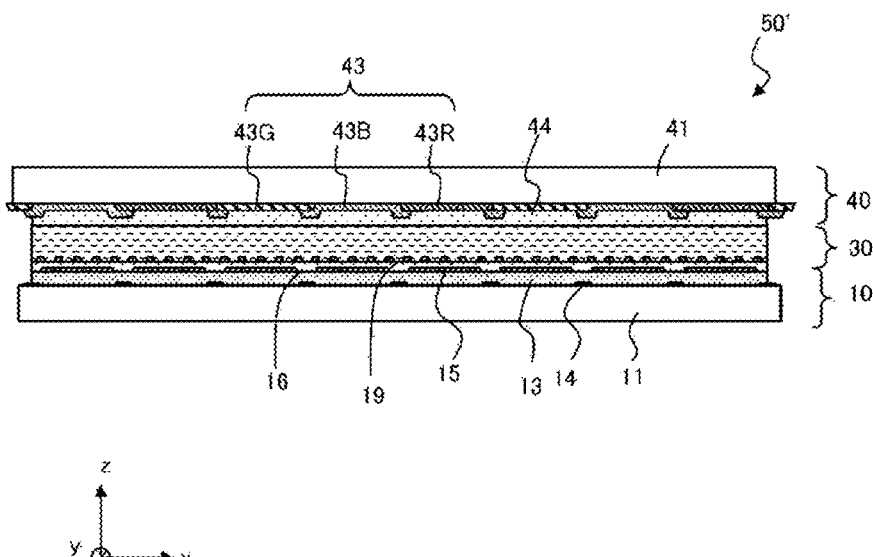
FIG. 12 is a schematic cross-sectional view in the x-axis direction of a first region of an image pickup apparatus equipped with a display function according to a second embodiment.
Figure 13:
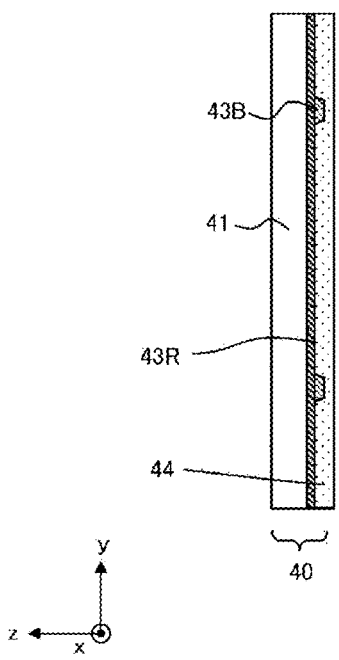
FIG. 13 is a schematic cross-sectional view in the y-axis direction of the first region of a pixel where a red filter is disposed in a counter substrate according to the second embodiment.
Figure 14:
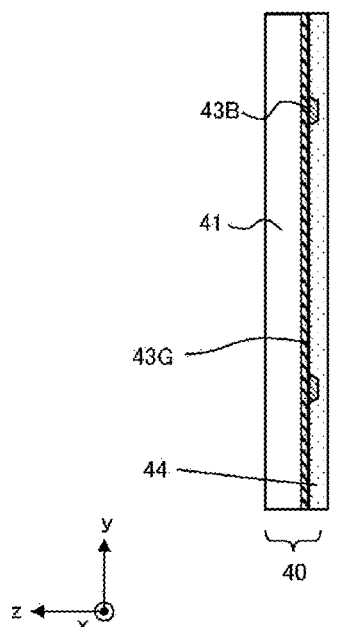
FIG. 14 is a schematic cross-sectional view in the y-axis direction of the first region of a pixel where a green filter is disposed in the counter substrate according to the second embodiment.
Figure 15:
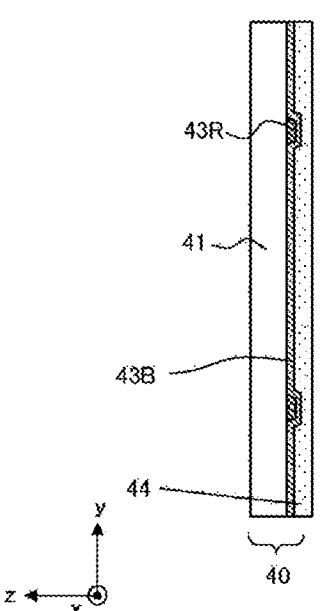
FIG. 15 is a schematic cross-sectional view in the y-axis direction of the first region of a pixel where a blue filter is disposed in the counter substrate according to the second embodiment.

FIG. 12 is a schematic cross-sectional view in the x-axis direction of the first region DR1 of an image pickup apparatus equipped with a display function. FIGS. 13 to 15 are schematic cross-sectional views in the y-axis direction of the first region of pixels where a red filter, green filter, and blue filter are disposed, respectively, of a counter substrate of a liquid crystal panel.

The image pickup apparatus equipped with a display function of the present embodiment is different from the first embodiment in that two or more different color filters are superposed in a region in contact with a boundary between adjacent pixels of the pixels in the first region DR1.

For example, a case is considered in which three color filters are formed in such a manner that a green filter 43G is first formed, a red filter 43R is subsequently formed, and a blue filter 43B is finally formed. A boundary extending in the y-axis direction of a pair of adjacent pixels may be a combination of red-green, green-blue, and blue-red color filters.

At a boundary between the red filter and the green filter, an end portion of the green filter 43G and an end portion of the red filter 43R are in contact with each other, and the blue filter 43B is superposed thereon. At a boundary between the green filter and the blue filter, an end portion of the blue filter 43B is superposed on an end portion of the green filter 43G. At a boundary between the blue filter and the red filter, an end portion of the blue filter 43B is superposed on an end portion of the red filter 43R.

On the other hand, color filters of the same color are disposed in pixels adjacent to each other in the y-axis direction. For this reason, color filters of different colors are disposed being superposed. As illustrated in FIG. 13, at a boundary extending in the x-axis direction between pixels to which the red filter 43R is adjacent in the y-axis direction, the stripe-shaped blue filter 43B extending in the x-axis direction is located on the red filter 43R, whereby two or more different color filters are superposed.

As illustrated in FIG. 14, at a boundary extending in the x-axis direction between pixels to which the green filter 43G is adjacent in the y-axis direction, the stripe-shaped blue filter 43B extending in the x-axis direction is located on the green filter 43G, whereby two or more different color filters are superposed. As illustrated in FIG. 15, at a boundary extending in the x-axis direction between pixels to which the blue filter 43B is adjacent in the y-axis direction, the stripe-shaped red filter 43R extending in the x-axis direction is located under the blue filter 43B, whereby two or more different color filters are superposed.

When a width of superposition of two different color filters in the x-axis direction is taken as Wx, and a width of superposition thereof in the y-axis direction is taken as Wy, it is preferable that a pixel pitch px in the x-axis direction and a pixel pitch py in the y-axis direction respectively satisfy the following relations.

$$0.01 \times px \le Wx \le 0.2px$$

$$0.01 \times py \le Wy \le 0.2py$$

With the above-discussed configuration, the color filters of adjacent pixels can be more reliably brought into contact with each other. This makes it possible to further reduce the possibility that the color filters are not in contact with each other and a gap is generated due to a manufacturing error at the time of forming the color filters. In addition, since two or more color filters are superposed at a boundary of pixels, a region that transmits none of the color light of the color filters formed in the respective pixels is formed at the boundary between adjacent pixels. As a result, mixing of light between adjacent pixels is suppressed, thereby making it possible to display a clearer image. In particular, in observation obliquely in the x-axis direction, an excellent effect of suppressing mixing of light between adjacent pixels may be obtained.

One of the two color filters superposed between adjacent pixels is preferably a blue filter. This is because the blue filter has low transmittance and low reflectivity, and a blue-based color tends to be relatively preferred for a reflected color.

The number of color filters superposed at a boundary between adjacent pixels in the first region DR1 is not limited to two, and may be three or more. That is, the image pickup apparatus equipped with a display function of the present embodiment may differ from the first embodiment in that three or more different color filters are superposed at a region in contact with a boundary between adjacent pixels of the pixels in the first region DR1.

Figure 16:
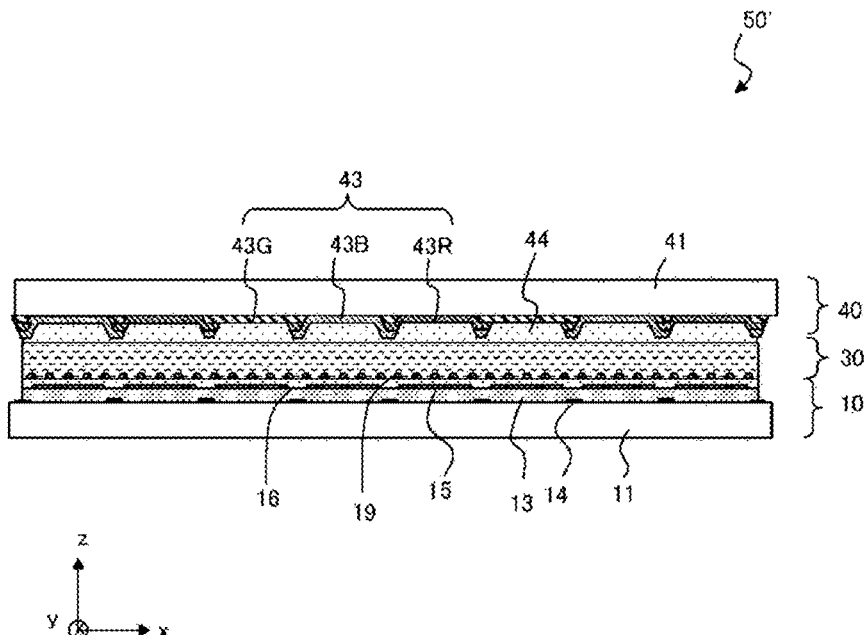
FIG. 16 is a schematic cross-sectional view in the x-axis direction of the first region of another image pickup apparatus equipped with a display function according to the second embodiment.
Figure 17:
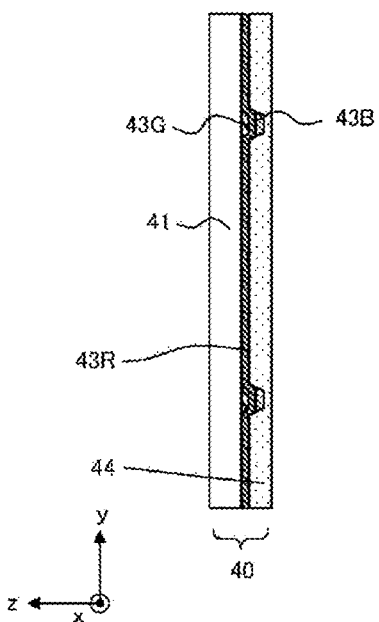
FIG. 17 is a schematic cross-sectional view in the y-axis direction of the first region of a pixel where a red filter is disposed in the counter substrate illustrated in FIG. 16.
Figure 18:
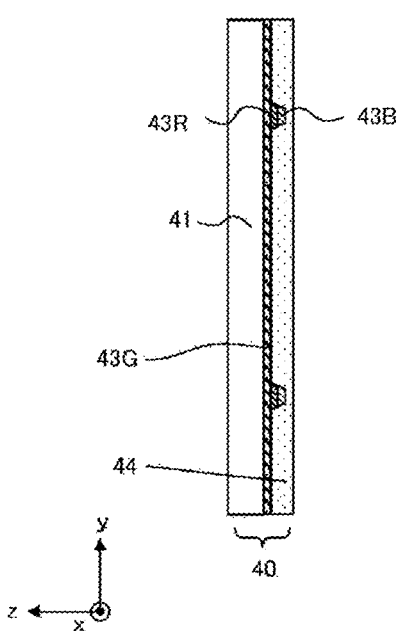
FIG. 18 is a schematic cross-sectional view in the y-axis direction of the first region of a pixel where a green filter is disposed in the counter substrate illustrated in FIG. 16.
Figure 19:
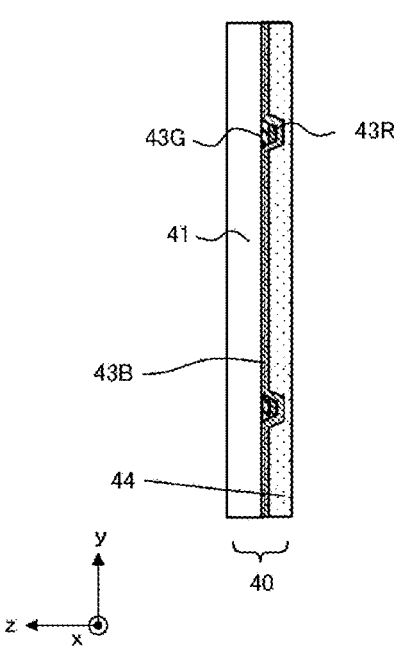
FIG. 19 is a schematic cross-sectional view in the y-axis direction of the first region of a pixel where a blue filter is disposed in the counter substrate illustrated in FIG. 16.

FIG. 16 is a schematic cross-sectional view in the x-axis direction of the first region DR1 of an image pickup apparatus equipped with a display function. FIGS. 17 to 19 are schematic cross-sectional views in the y-axis direction of the first region of pixels where a red filter, green filter, and blue filter are disposed, respectively, of a counter substrate of a liquid crystal panel.

In the pixels arrayed in the x-axis direction, at a boundary between the red filter and the green filter, an end portion of the red filter 43R is superposed on an end portion of the green filter 43G. Further, the stripe-shaped blue filter 43B extending in the y-axis direction is disposed to be superposed thereon. At a boundary between the green filter and the blue filter, the red filter 43R extending in the y-axis direction is disposed to be superposed on an end portion of the green filter 43G, and the blue filter 43B is disposed to be superposed thereon. At a boundary between the blue filter and the red filter, an end portion of the red filter 43R is disposed to be superposed on the green filter 43G extending in the y-axis direction, and an end portion of the blue filter 43B is superposed thereon.

On the other hand, color filters of the same color are disposed in pixels adjacent to each other in the y-axis direction. For this reason, color filters of different colors extending in the x-axis direction are disposed being super-posed. As illustrated in FIG. 17, at a boundary extending in the x-axis direction between pixels to which the red filter 43R is adjacent in the y-axis direction, the red filter 43R is disposed on the stripe-shaped green filter 43G extending in the x-axis direction, and the blue filter 43B extending in the x-axis direction is further disposed to be superposed thereon.

As illustrated in FIG. 18, at a boundary extending in the x-axis direction between pixels to which the green filter 43G is adjacent in the y-axis direction, the stripe-shaped red filter 43R extending in the x-axis direction is superposed on the green filter 43G, and the stripe-shaped blue filter 43B extending in the x-axis direction is further disposed to be superposed thereon. As illustrated in FIG. 19, at a boundary extending in the x-axis direction between pixels to which the blue filter 43B is adjacent in the y-axis direction, the stripe-shaped red filter 43R extending in the x-axis direction is disposed to be superposed on the stripe-shaped green filter 43G extending in the x-axis direction, and the blue filter 43B is further disposed thereon. A preferable value of the super-position width of the three different color filters is as described above.

As discussed above, since the color filters of three or more different colors are superposed at a boundary between adjacent pixels, a region that does not transmit any color light is formed at the boundary between the adjacent pixels. As a result, mixing of light between adjacent pixels is suppressed, thereby making it possible to display a clearer image. In particular, in observation obliquely in the x-axis direction, an excellent effect of suppressing mixing of light between adjacent pixels may be obtained.

In the present embodiment, two or three or more different color filters are superposed at a region in contact with a boundary between adjacent pixels in the first region DR1, and the black matrix 42 is formed in the second region DR2 as in the first embodiment. However, as described in the first embodiment, also in the second region, the counter substrate may be allowed not to include a black matrix, and two or three or more different color filters may be superposed at a region in contact with a boundary between adjacent pixels. As a result, the structure of each pixel is the same in the first region DR1 and the second region DR2, and it is possible to display an image in which a difference in display quality between the first region DR1 and the second region DR2 is not noticeable.

The order in which the color filters are superposed depends on the order in which the color filters are formed, and the image pickup apparatus equipped with a display function of the disclosure is not limited to the specific structure described in the present embodiment. For example, in a case where the color filters are formed on the counter substrate in the order of the red filter 43R, the blue filter 43B, and the green filter 43G, in the structure described above, the green filter 43G can be replaced with the red filter 43R, the red filter 43R can be replaced with the blue filter 43B, and the blue filter 43B can be replaced with the green filter 43G.

Third Embodiment

Figure 20:
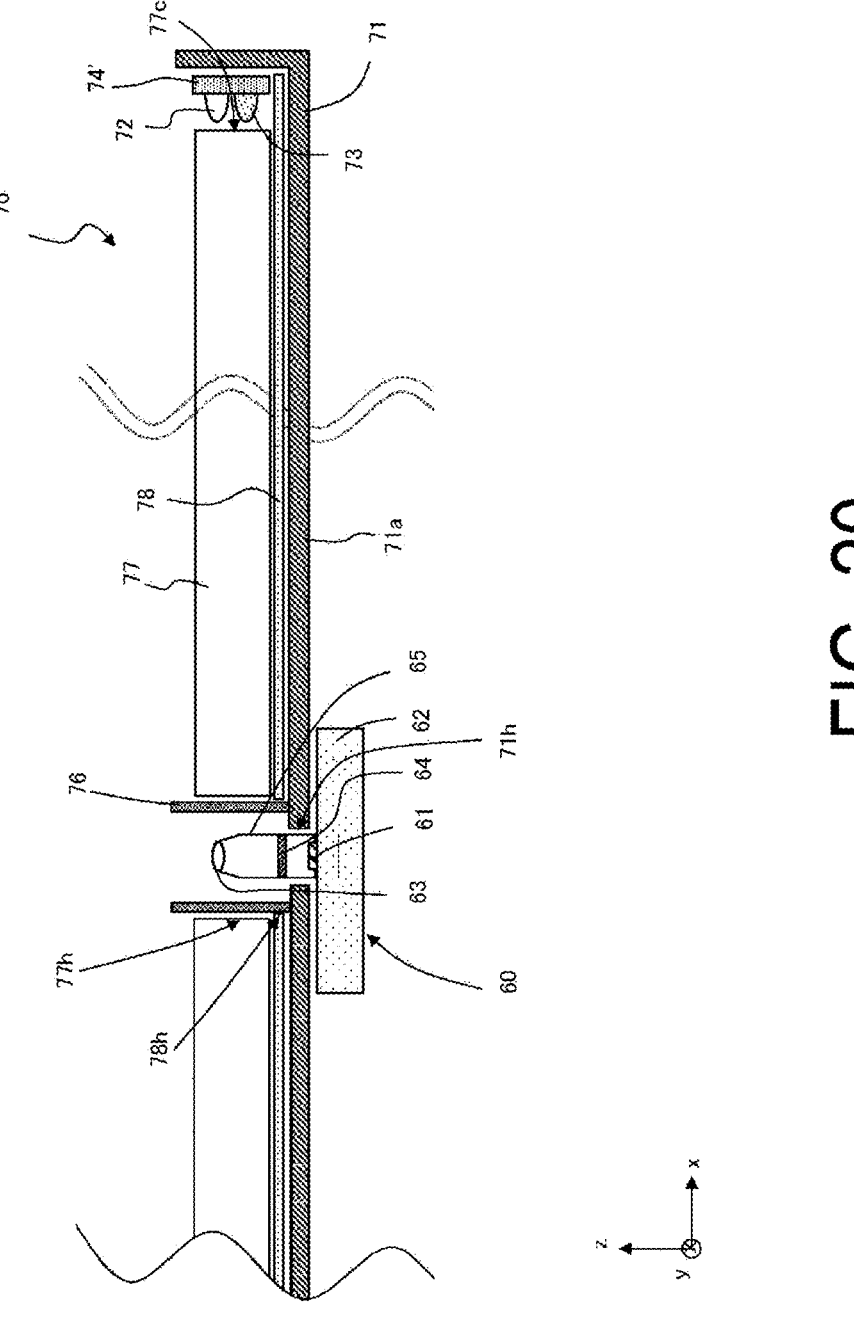
FIG. 20 is a schematic cross-sectional view of an image pickup apparatus equipped with a display function according to a third embodiment.

FIG. 20 is a schematic cross-sectional view of an image pickup apparatus equipped with a display function of the present embodiment. The image pickup apparatus equipped with a display function is different from that of the first embodiment in that a backlight 70' of an edge type is provided.

The backlight 70' includes a chassis 71, a light guide plate 77, a display light-emitting element, and an infrared light-emitting element. The light guide plate 77 is disposed on a base 71a of the chassis 71. The backlight 70' may further include a reflective sheet 78 between the base 71a of the chassis 71 and the light guide plate 77.

A display light-emitting element 72 and an infrared light-emitting element 73 are mounted on a mounting substrate 74', and are disposed in the chassis 71 to face a side surface 77c of the light guide plate 77. Although one display light-emitting element 72 and one infrared light-emitting element 73 are depicted in the drawing, the display light-emitting element 72 and the infrared light-emitting element 73 are disposed on the side surface 77c of the light guide plate 77 depending on the required brightness.

The light guide plate 77 has a through-hole 77h at a position overlapping the first region DR1 in a plan view, and a lens-barrel 65 of an infrared camera 60 is inserted into the through-hole 77h. A shading body 76 is also disposed in the through-hole 77h.

In the backlight 70', the infrared light-emitting element 73 is disposed on the side surface 77c of the light guide plate 77, similarly to the display light-emitting element 72. With this, light that is output by the infrared light-emitting element 73 can be emitted from the display region DR, and can be used as illumination light at the time of imaging.

Accordingly, even in a case where the backlight 70' is of an edge type, since no black matrix is provided in the first region, the influence of the diffraction image of the image is suppressed and a clear infrared image can be acquired, as described in the first embodiment.

Figure 21:
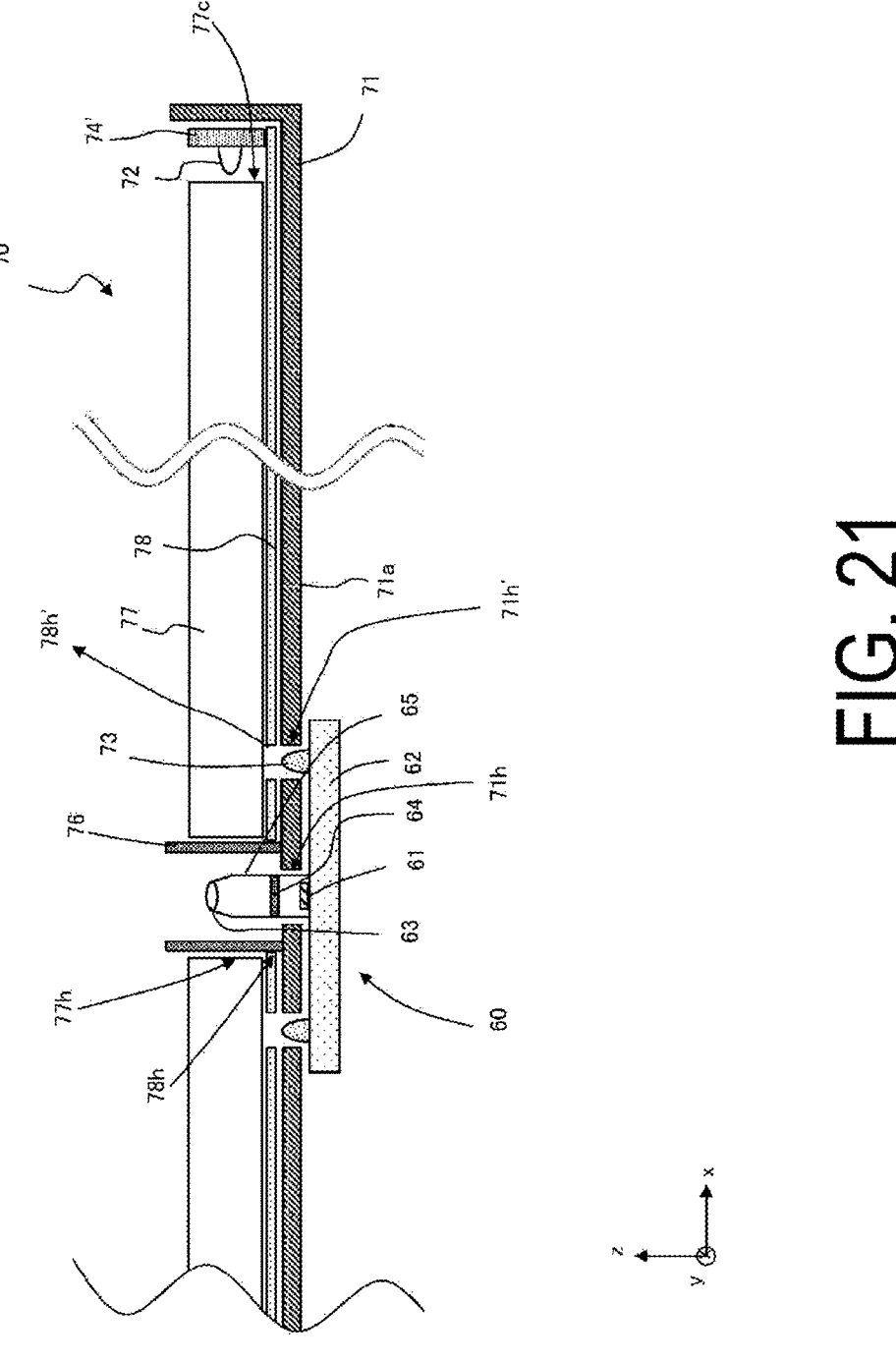
FIG. 21 is a schematic cross-sectional view of another image pickup apparatus equipped with a display function according to the third embodiment.

The infrared light-emitting element 73 is not limited to the position corresponding to the side surface 77c of the light guide plate, and may be disposed to face a main surface thereof. For example, as illustrated in FIG. 21, the infrared light-emitting element 73 is mounted on a circuit substrate 62 of the infrared camera 60. Through-holes 78h' and 71h' are formed in the reflective sheet 78 and the base 71a of the chassis 71, respectively, at positions overlapping the infrared light-emitting element 73 in a plan view. The through-holes 78h' and 71h' are provided at the positions overlapping the infrared light-emitting element 73 and also overlapping the second region DR2 of a liquid crystal panel 50 in a plan view.

With the above-discussed configuration, the infrared light-emitting element 73 faces the main surface of the light guide plate 77, and infrared light can be emitted from the back face of the liquid crystal panel 50 toward the outside. The illumination light for photographing the driver may be emitted from the vicinity of the periphery of the first region DR1. As a result, even in a case where the backlight is of an edge type, the number of infrared light-emitting elements 73 used for illumination can be reduced by disposing the infrared light-emitting elements 73 at the direct type posi-tion.

Fourth Embodiment

Figure 22:
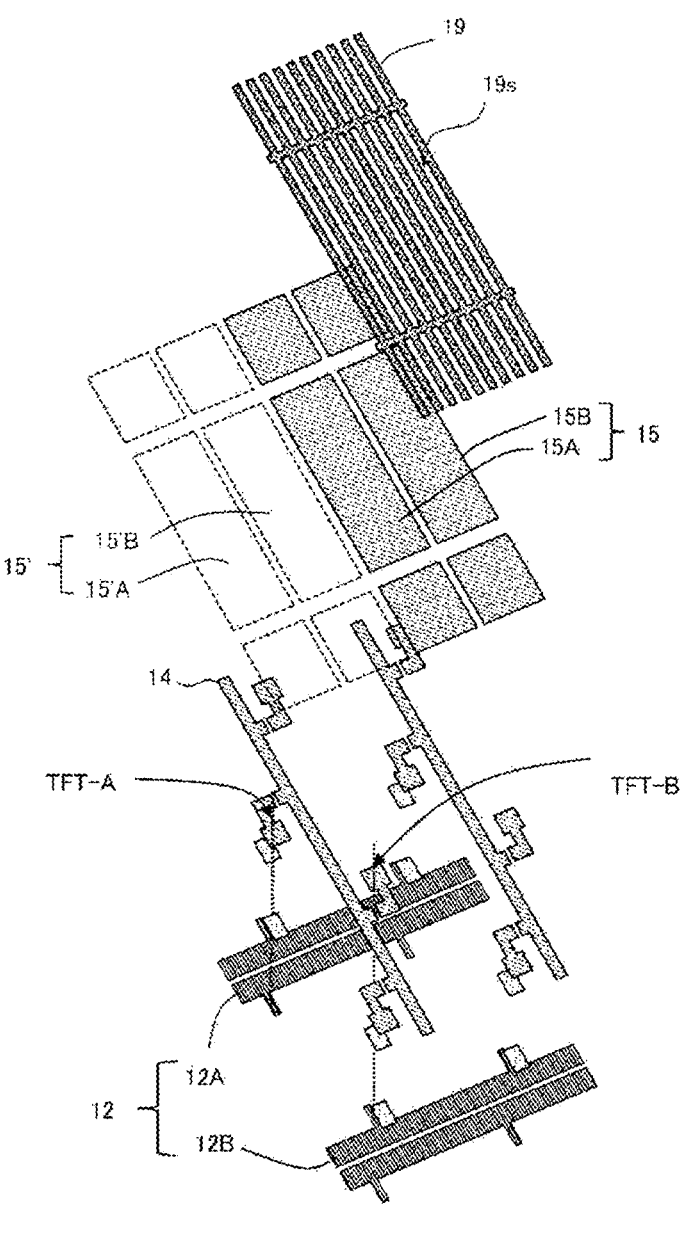
FIG. 22 is an exploded perspective view of main constituent elements in a liquid crystal panel of an image pickup apparatus equipped with a display function according to a fourth embodiment.
Figure 22:

FIG. 22 is an exploded perspective view of main con-stituent elements in a liquid crystal panel of an image pickup apparatus equipped with a display function according to the present embodiment. The liquid crystal panel of the image pickup apparatus equipped with a display function according to the present embodiment has a structure different from that of the liquid crystal panel according to the first embodiment.

To be specific, as illustrated in FIG. 22, a plurality of pixel electrodes 15 include a plurality of first pixel electrodes 15A and a plurality of second pixel electrodes 15B. The first pixel electrodes 15A and the second pixel electrodes 15B are alternately arrayed in the x-axis direction. In other words, one of the plurality of first pixel electrodes 15A and one of the plurality of second pixel electrodes 15B are adjacent to each other in the x-axis direction. A first pixel electrode 15'A and a second pixel electrode 15'B adjacent to each other share one data line 14. When viewed from another viewpoint, since the pixel electrodes 15 are two-dimensionally arranged in the x-axis direction and the y-axis direction, the paired adjacent first pixel electrode 15A and second pixel electrode 15B are arranged between a pair of adjacent data lines 14 in the x-axis direction.

A plurality of scanning lines 12 include a plurality of first scanning lines 12A and a plurality of second scanning lines 12B. The plurality of scanning lines 12 are respectively associated with the pixel electrodes 15 arrayed in the x-axis direction, where the first scanning lines 12A are associated with the first pixel electrodes 15A, and the second scanning lines 12B are associated with the second pixel electrodes 15B. The first scanning line 12A of one scanning line 12 among the plurality of scanning lines is arranged at an upper end of the pixel electrode 15 arrayed in the x-axis direction, and the second scanning line 12B is arranged at a lower end thereof. When viewed from another viewpoint, since the pixel electrodes 15 are two-dimensionally arranged in the x-axis direction and the y-axis direction, one of the plurality of first scanning lines 12A and one of the plurality of second scanning lines 12B are arranged between a pair of adjacent pixel electrodes 15 in the y-axis direction among the plurality of pixel electrodes 15.

The first pixel electrode 15'A and the second pixel electrode 15'B arranged on both sides of one data line 14 are scanned by different scanning lines. To be specific, the first pixel electrode 15'A is scanned by the first scanning line 12A via a TFT-A, and the second pixel electrode 15'B is scanned by the second scanning line 12B via a TFT-B.

Each data line 14 is located between the paired first pixel electrode and second pixel electrode (first pixel electrode 15'A and second pixel electrode 15'B) arranged in the x-axis direction, and drives both of these pixel electrodes. In other words, one data line 14 is shared by two pixels (pixel electrodes 15'A and 15'B) sandwiching the data line 14. Since the two pixels are different pixels, different data signals need to be supplied at different timings. Due to this, the total number of scanning lines is doubled. In other words, the two scanning lines 12A and 12B are required to operate the pixels (pixel electrodes 15'A and 15'B) adjacent to each other in the x-axis direction. Since one data line is shared by two pixels, the write time is halved. However, the total number of data lines is halved as compared with the general liquid crystal panel. In other words, the data lines 14 are arranged at a pitch twice the pixel pitch in the x-axis direction.

As described above, when an image is acquired by infrared light via the black matrix, a multiple image in the x-axis direction is remarkably detected depending on the shape of the pixel. This is because the interval between the diffraction images is inversely proportional to the slit interval d, and the interval between the diffraction images is larger as the black matrix interval is smaller.

According to the image pickup apparatus equipped with a display function of the disclosure, since a black matrix is not formed in the first region of the liquid crystal panel, the influence of the diffraction image caused by the black matrix is reduced. However, when the liquid crystal panel becomes higher in definition and the pixel pitch becomes smaller, not only the black matrix but also the data line made of metal may cause a diffraction image. In this case, by adopting the structure of the present embodiment and making the data line pitch twice the pixel pitch, the slit interval can be made twice and an increase in the interval between the diffraction images can be suppressed.

That is, according to the present embodiment, even in a case where a high-definition liquid crystal panel is employed, it is possible to suppress a situation in which the interval between the diffraction images is widened and causes the image to be unclear.

Fifth Embodiments

Figure 23:
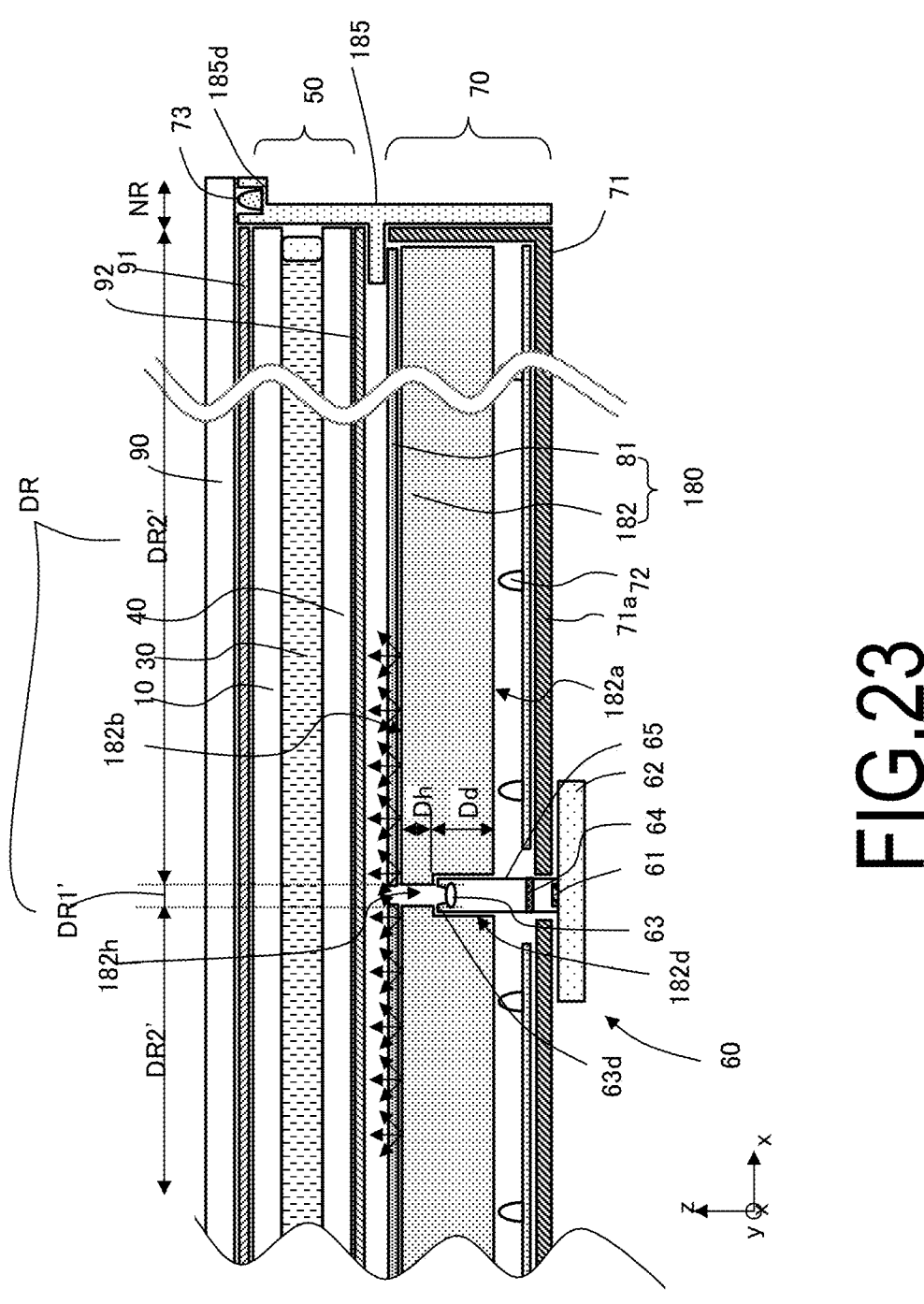
FIG. 23 is a schematic cross-sectional view of an image pickup apparatus equipped with a display function according to a fifth embodiment.
Figure 24:
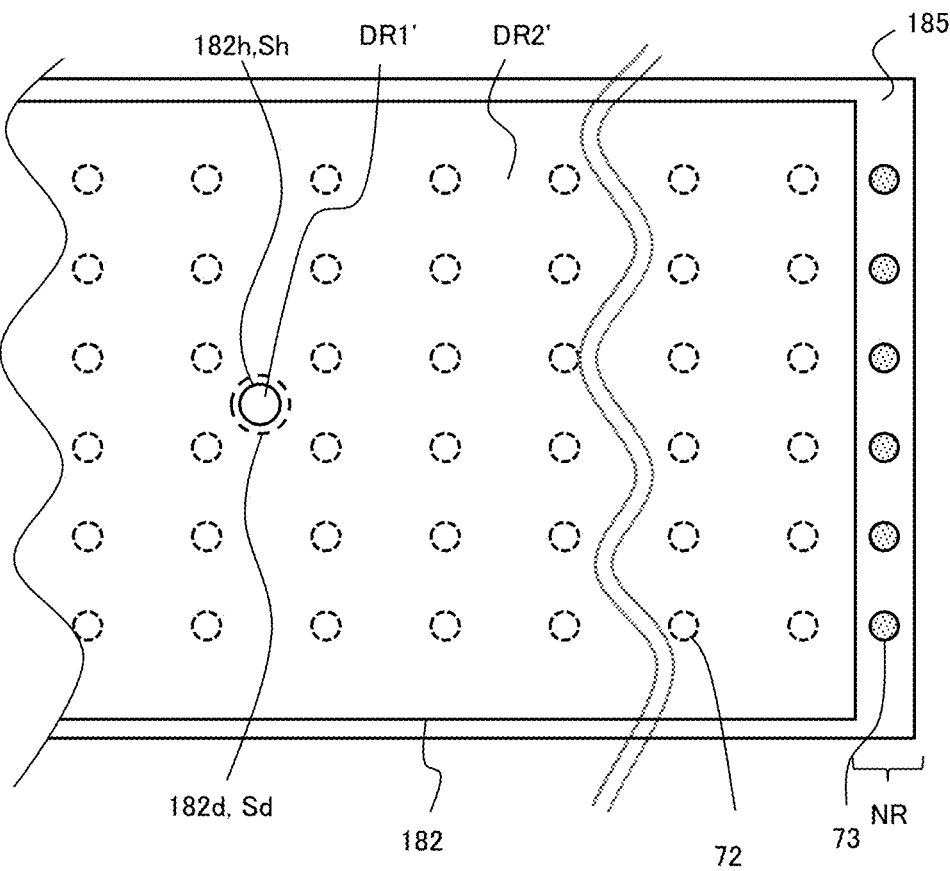
FIG. 24 is a schematic plan view of main portions of the image pickup apparatus equipped with a display function according to the fifth embodiment.

FIG. 23 is a schematic cross-sectional view of main portions in a liquid crystal panel of an image pickup apparatus equipped with a display function according to the present embodiment, and FIG. 24 is a schematic plan view of main portions of the same. The image pickup apparatus equipped with a display function according to the present embodiment includes an optical structure 180 having a shape different from that in the first embodiment. The image pickup apparatus equipped with a display function according to the present embodiment does not include a shading body, and a liquid crystal panel thereof does not include a black matrix in an entire display region DR. As described in the first embodiment, a first region DR1' is defined by a region overlapping a condenser lens 63 of an infrared camera 60 in a plan view. The liquid crystal panel, in the first region DR1', includes color filters and does not include a black matrix. The first region DR1' is located on a light path of light entering an imaging element 61 of the infrared camera 60.

Specifically, the image pickup apparatus equipped with a display function according to the present embodiment includes: a liquid crystal panel 50 including a display region DR; an infrared camera 60 including a condenser lens 63, an imaging element 61, and a lens-barrel 65 that supports the condenser lens 63 with a predetermined space being interposed between the condenser lens 63 and the imaging element 61; a backlight 70 disposed on a back face of the liquid crystal panel 50; and an optical structure 180 disposed between the liquid crystal panel 50 and the backlight 70.

As described above, the optical structure 180 includes at least one optical sheet having an optical function. In the present embodiment, as illustrated in FIG. 23, the optical structure 180 includes a brightness enhancement film 81 and a diffuser 182. The diffuser 182 includes a first main surface 182a and a second main surface 182b. The first main surface 182a is located on a side of a base 71a of the backlight 70, and the second main surface 182b is located on a side of the liquid crystal panel 50.

The diffuser 182 includes a recessed part 182d disposed on the first main surface 182a and a through-hole 182h located between a bottom face of the recessed part 182d and the second main surface 182b. The through-hole 182h has a smaller opening area Sh than an area Sd of the bottom face of the recessed part 182d. Preferably, the through-hole 182h has a smaller depth Dh than a depth Dd of the recessed part 182d (the through hole 182h is shallower than the recessed part 182d). The through-hole 182h of the diffuser 182 is superposed on the lens-barrel 65 in a plan view. The through-hole 182h has a smaller area than that of the lens-barrel 65 in a plan view. That is, the entirety of the through-hole 182h is superposed on the lens-barrel 65 in a plan view. Such a structure of the diffuser 182, particularly, the above-described satisfied relationship between the depth Dh of the through-hole 182h and the depth Dd of the recessed part 182d, prevents infrared light that enters the condenser lens 63 from an oblique direction from being blocked by the diffuser 182 in the through-hole 182h, thereby preventing the angle of view of the infrared camera from becoming narrow.

At least a portion of the diffuser 182 is disposed within the chassis 71 of the backlight 70. In the present embodiment, the entirety of the diffuser 182 is disposed within the chassis 71. That is, the diffuser 182 is close to the base 71a of the chassis 71. Furthermore, at least a portion of the lens-barrel 65 is located within the recessed part 182 d of the diffuser 182. In particular, the condenser lens 63 supported by the lens-barrel 65 is preferably located within the recessed part 182d.

Light incident on the diffuser 182 from the display light-emitting element 72 of the backlight 70 is repeatedly diffused within the diffuser 182, and is emitted from the second main surface 182b while being diffused as indicated by the arrows. As described above, in a plan view, the through-hole 182h of the diffuser 182 is superposed on the lens-barrel 65, and the area of the through-hole 182h is smaller than the area of the lens-barrel 65. Therefore, even in the region where the lens-barrel 65 and the diffuser 182 are superposed on each other in a plan view, light is emitted vertically from the second main surface 182b of the diffuser 182. Furthermore, the light emitted from the second main surface 182b also travels in an oblique direction and spreads above the through-hole 182h. That is, within the diffuser 182, the light is guided up to the boundary part with the through-hole 182h, and the light that is diffused near the boundary and emitted in an oblique direction passes through the liquid crystal panel 50 and reaches the viewer. Therefore, in a plan view, a decrease in brightness in the region overlapping the lens-barrel 65 in the display region DR is suppressed, and the uniformity of the light emitted from the backlight 70 in the display region DR can be improved.

In particular, according to the present embodiment, it is possible to make the area of the through-hole 182h smaller than the area of the lens-barrel 65, and it is possible to increase the region within the lens-barrel 65 in a plan view from which light can be emitted vertically from the second main surface 182b. Therefore, according to the present embodiment, regardless of the cross-sectional area of the lens-barrel 65 or the diameter of the condenser lens, the opening of the through-hole 182h can be made small, thereby making it possible to reduce the region in the display region DR where the brightness decreases.

In addition, since the recessed part 182d is formed in the diffuser 182, it is easy to align the diffuser 182 with the lens-barrel 65 that holds the condenser lens 63, and the like, and misalignment therebetween can be suppressed even if the opening area of the through-hole 182h is small. In particular, when the alignment precision between the through-hole 182h and the lens-barrel 65 is poor, it is necessary to enlarge the opening of the through-hole 182h to ensure the amount of light required for imaging. According to the present embodiment, however, such a design is not necessary. Therefore, it is possible to further reduce the opening area of the through-hole 182h and improve uniformity of the brightness within the display region DR.

Furthermore, when the diffuser 182 having the recessed part 182d and the through-hole 182h is formed, for example, with two members, an air layer interface is generated within the diffuser 182 between the two members. Since light is reflected at the air layer interface, the transmittance of light from the first main surface 182a to the second main surface 182b may decrease, and the distribution of light near the through-hole 182h and the recessed part 182d may become non-uniform. In contrast, by forming the diffuser 182 with a single member, it is possible to suppress such a decrease in light transmittance and non-uniformity in light distribution, and to increase the uniformity of brightness within the display region DR. Furthermore, since the diffuser 182 is a single member, assembly is easy.

In the present embodiment, the infrared light-emitting element 73 irradiates a subject directly with infrared light without the infrared light being transmitted through the liquid crystal panel 50. For this purpose, the image pickup apparatus equipped with a display function according to the present embodiment includes a housing 185. The housing 185 includes a holder 185d in a non-display region NR located outside the display region DR, and a plurality of infrared light-emitting elements 73 are disposed in the holder 185d. Furthermore, as in the first embodiment, the housing 185 holds the backlight 70 at a predetermined position relative to the liquid crystal panel 50.

With this configuration, the infrared light-emitting elements 73 are disposed in the non-display region NR, and the infrared light emitted from the infrared light-emitting elements 73 for image taking reaches the subject directly, without passing through the liquid crystal panel 50. Therefore, compared to when the infrared light-emitting elements 73 are disposed on the back face side of the liquid crystal panel 50 and within the display region DR, infrared light is prevented from becoming stray light within the backlight 70 and entering the imaging element 61 of the infrared camera 60. This makes it possible to acquire a clear image. In particular, even if the shading body 76 is not provided, such an effect can be achieved.

Figure 25:
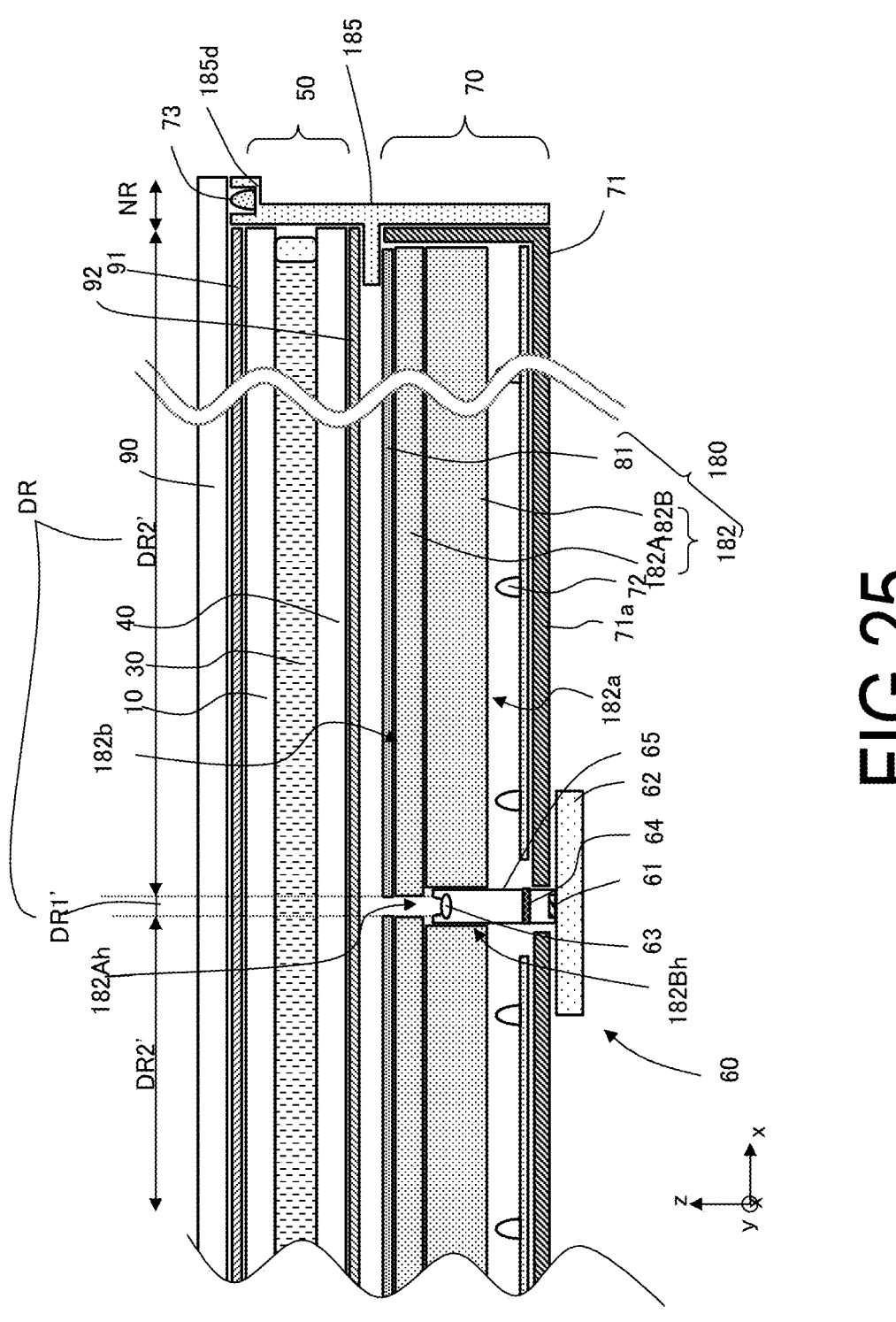
FIG. 25 is a schematic cross-sectional view of the image pickup apparatus equipped with a display function according to the fifth embodiment.

FIG. 25 is a schematic cross-sectional view of a main portion showing another example of an image pickup apparatus equipped with a display function according to the present embodiment. The diffuser 182 of the optical structure 180 includes a first diffuser plate 182A and a second diffuser plate 182B. The first diffuser plate 182A and the second diffuser plate 182B have a first through-hole 182Ah and a second through-hole 182Bh, respectively. The first through-hole 182Ah and the second through-hole 182Bh each have, for example, a simple cylindrical shape, and the opening area of the second through-hole 182Bh is larger than the opening area of the first through-hole 182Ah.

The first diffuser plate 182A and the second diffuser plate 182B are laminated such that the axis of the first through-hole 182Ah coincides with the axis of the second through-hole 182Bh. Furthermore, the second diffuser plate 182B is closer to the base 71a of the backlight 70 than the first diffuser plate 182A is.

By forming the diffuser with two plate-like members in this manner, the recessed part and the through-hole of the diffuser 182 can be formed more easily, and the manufacturing costs of the diffuser 182 can be reduced. Furthermore, since the diffuser 182 is formed with two members, the optical properties of the first diffuser plate 182A and the second diffuser plate 182B can be made different from each other, and the optical function of the entire diffuser can be adjusted. For example, the material cost can be reduced by reducing the haze value of the second diffuser plate 182B.

Figure 26:
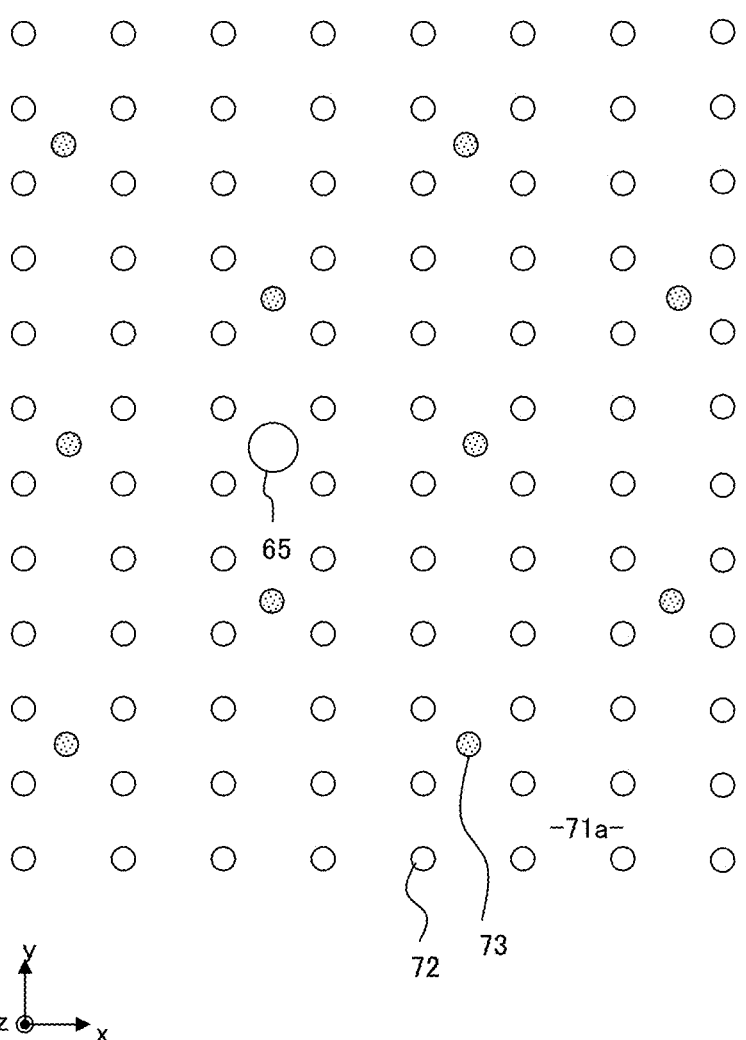
FIG. 26 is a schematic plan view of an exemplary arrangement of a plurality of display light-emitting elements and a plurality of infrared light-emitting elements of a backlight in the image pickup apparatus equipped with a display function according to the fifth embodiment.

In the present embodiment, the infrared light-emitting elements 73 are disposed in the non-display region NR, but similarly to the first embodiment, the infrared light-emitting elements 73 may be disposed in the backlight 70. FIG. 26 is a schematic plan view of an exemplary arrangement of a plurality of display light-emitting elements 72 and a plurality of infrared light-emitting elements 73 in a backlight 70.

A plurality of display light-emitting elements 72 and a plurality of infrared light-emitting elements 73 are disposed on a base 71$a$ of a chassis 71. Specifically, for example, the plurality of display light-emitting elements 72 are arranged at equal pitches in the x-axis direction and the y-axis direction. Each of the plurality of infrared light-emitting elements 73 is arranged, for example, among mutually adjacent four of the display light-emitting elements 72. In the present embodiment, the plurality of infrared light-emitting elements 73 are arranged at equal pitches in the x-axis direction and the y-axis direction. The array pitch of the infrared light-emitting elements 73 is larger than the array pitch of the display light-emitting elements 72. For example, in the present embodiment, the array pitch of the infrared light-emitting elements 73 is four times the array pitch of the display light-emitting elements 72. In the present embodiment, one infrared light-emitting element 73 is disposed in the center of the mutually adjacent four of the infrared light-emitting elements 73. Further, the lens-barrel 65 is arranged among the four display light-emitting elements 72 that are mutually adjacent among the display light-emitting elements 72 that are arranged at equal pitches.

According to the present configuration, the infrared light-emitting elements are disposed in the backlight, which can make the frame region narrow. Furthermore, by arranging the plurality of infrared light-emitting elements 73 at equal pitches, infrared light for image taking can be emitted uniformly. Furthermore, by making the arrangement pitch of the infrared light-emitting elements larger than the arrangement pitch of the display light-emitting elements, it becomes possible to arrange the infrared light-emitting elements away from the condenser lens 63 of the infrared camera 60. This makes it possible to prevent the infrared light emitted from the infrared light-emitting elements 73 from directly entering the infrared camera 60 as stray light. Furthermore, since the arrangement pitch of the display light-emitting elements 72 does not change and is kept constant even around the lens-barrel 65, a uniform display with little decrease in brightness can be obtained even around the lens-barrel 65.

Sixth Embodiment

Figure 27:
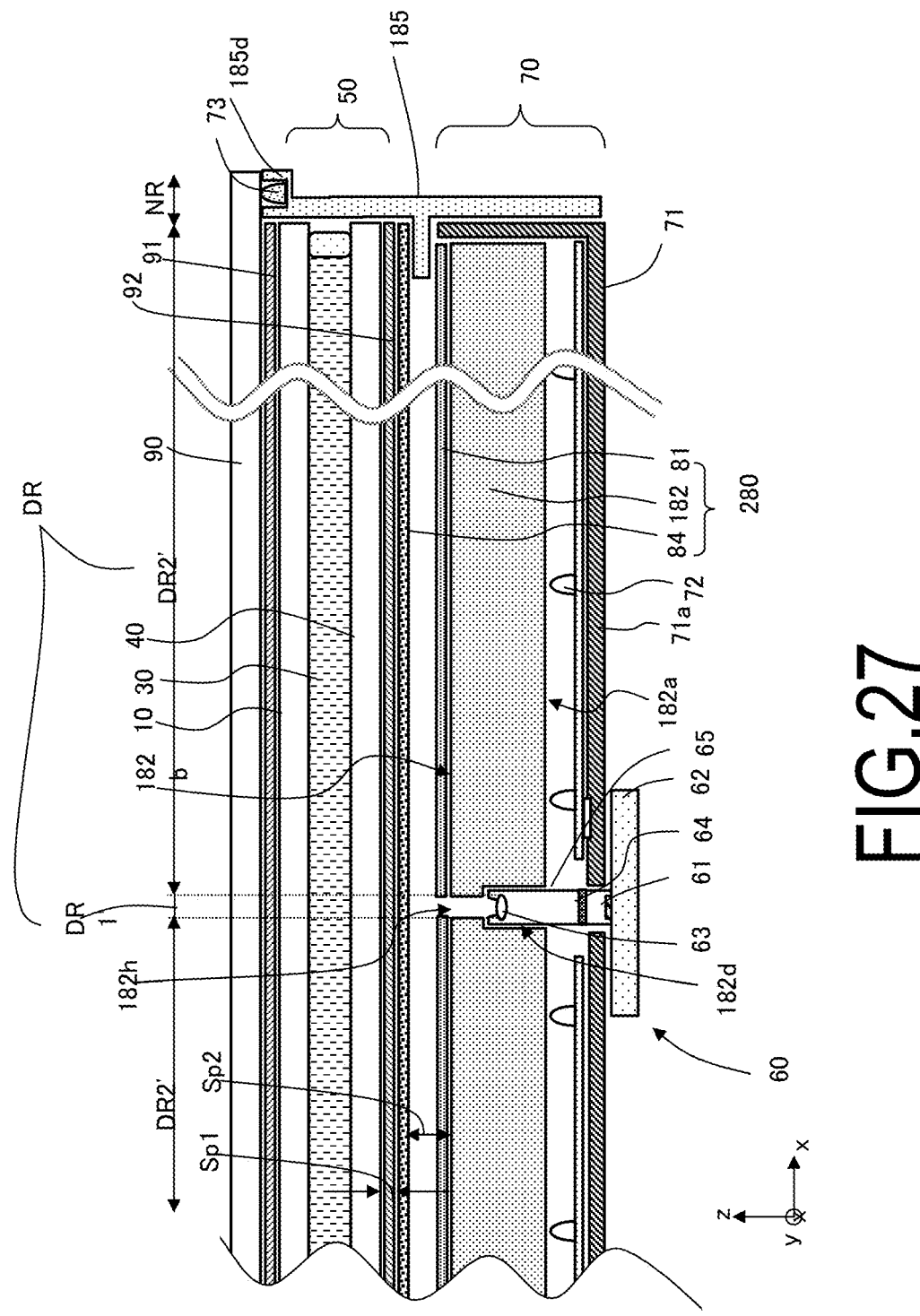
FIG. 27 is a schematic cross-sectional view of an image pickup apparatus equipped with a display function according to a sixth embodiment.

FIG. 27 is a schematic cross-sectional view of a main portion of an image pickup apparatus equipped with a display function according to the present embodiment. The image pickup apparatus equipped with a display function according to the present embodiment differs from the fifth embodiment in that the optical structure 280 further includes a second diffuser 84.

The second diffuser 84 is disposed, for example, between a liquid crystal panel and a brightness enhancement film 81 or the diffuser 182 of the optical structure 280. It is preferable that a space Sp1 between the second diffuser 84 and the liquid crystal panel 50 is smaller than a space Sp2 between the second diffuser 84 and the diffuser 182. The second diffuser 84 is superposed on the entirety of the first region DR1' and the second region DR2' in a plan view.

In the second diffuser 84, the haze value for visible light is greater than the haze value for infrared light. Furthermore, in the second diffuser 84, the rectilinear transmittance for visible light that is smaller than the rectilinear transmittance for infrared light. That is, the second diffuser 84 diffuses visible light more than infrared light. The second diffuser 84 having such optical properties can be formed with a film, a substrate, or the like in which a polymer dispersed liquid crystal (PDLC) is interposed.

The present embodiment differs from the fifth embodiment in that the visible light from the backlight diffused by the diffuser 182 is diffused again by the second diffuser 84 immediately before entering the liquid crystal panel 50. In the fifth embodiment, the visible light spreading above the through-hole 182$h$ is light traveling in an oblique direction, and in regions other than the through-hole 182$h$, the visible light also contains light traveling in a vertical direction in addition to the light traveling in an oblique direction. In the present embodiment, light traveling in an oblique direction above the through-hole 182$h$ enters the second diffuser 84, is diffused again, and is emitted from the second diffuser 84 in both vertical and oblique directions. Of course, in regions other than the region above the through-hole 182$h$ as well, the light that has entered the second diffuser 84 is diffused again and is emitted from the second diffuser 84 in both vertical and oblique directions. By arranging the second diffuser 84 in this manner, there is no difference between the region above the through-hole 182$h$ and the other regions, regarding the diffusion state of the light emitted from the second diffuser 84.

This structure allows visible light from the backlight to be more scattered, making the boundary between the first region DR1' and the second region DR2' less noticeable. In particular, when the liquid crystal panel 50 performs white display or high brightness display, a decrease in brightness in the first region DR1' is suppressed, making the first region DR1' less noticeable. On the other hand, since the haze value for infrared light is small, infrared images can be taken with good resolution.

Furthermore, because the space Sp2 is larger than the space Sp1, as described with reference to FIG. 23, more light reaches above the through-hole 182$h$, suppressing a decrease in the brightness in the first region DR1' and differences in the light diffusion state. Therefore, the uniformity of the light emitted from the backlight 70 within the display region DR can be improved.

Seventh Embodiment

In the image pickup apparatuses equipped with a display function according to the first to sixth embodiments, the backlight 70 is controlled to be constantly lit as a backlight of a typical liquid crystal panel, or to be periodically turned off in order to insert a black image display by pseudo-impulse driving. There are no particular limitations on the timings of operations of the infrared camera 60 and the infrared light-emitting elements 73 for image taking. For example, the infrared light-emitting elements 73 may be constantly lit and image taking by the infrared camera 60 may be constantly performed; or the infrared light-emitting elements 73 may be constantly lit and imaging by the infrared camera 60 may be constantly performed only for a predetermined period within one frame period.

Figure 28:
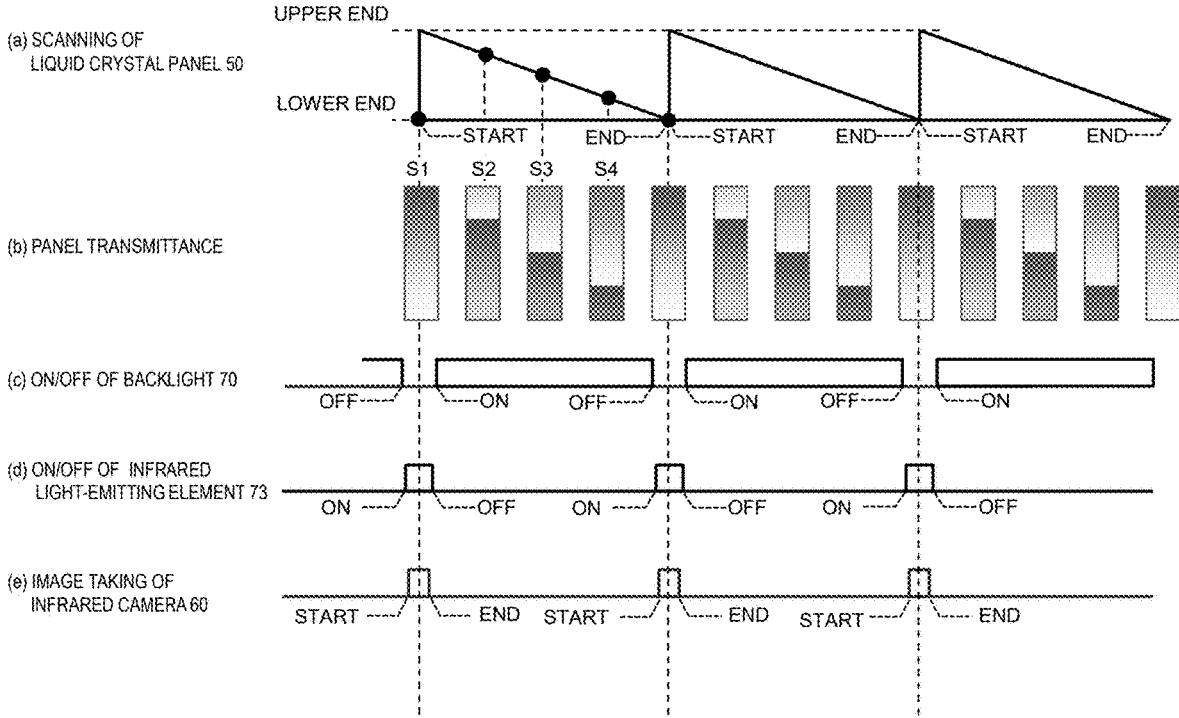
FIG. 28 is a timing chart showing operation timings of respective parts of an image pickup apparatus equipped with a display function according to a seventh embodiment.

In contrast to this, in the image pickup apparatus equipped with a display function according to the present embodiment, the timing of turning on the backlight 70 and the timing of turning on the infrared light-emitting elements 73 are associated with each other. FIG. 28 is a timing chart showing the operation timings of each portion in the image pickup apparatus equipped with a display function according to the present embodiment. In FIG. 28, (a) shows the timing of scanning the liquid crystal panel 50, (b) shows the transmittance of the liquid crystal panel, and (c) shows the timing of lighting the backlight 70. Also, (d) shows the timing of turning on the infrared light-emitting elements 73, and (e) shows the timing when the infrared camera 60 takes an image. (a) shows respective positions of the turned-on scanning lines (gate lines) during one scanning period of the liquid crystal panel 50, and (b) shows the transmittance of the liquid crystal panel at the timing indicated by each circle in (a) when the entirety of the liquid crystal panel 50 is displayed in a uniform neutral color. In the drawing, the black and white shading indicates differences in transmittance, with white indicating high transmittance and black indicating low transmittance. (c) and (d) indicate, at a high level, the timing when the backlight 70 and the infrared light-emitting elements 73 are turned on and illuminated. (e) indicates, at a high level, the timing when the infrared camera 60 is taking an image. In each chart, the horizontal axis indicates the passage of time.

Generally, in a liquid crystal panel, scanning lines arrayed in a column direction (vertical direction) are selected in sequence from the upper end to the lower end during one scanning period, and a voltage is applied to the selected scanning line. This causes the switching elements of the pixels connected to the selected scanning line to be turned ON, and electric charges are accumulated between the pixel electrodes and the counter electrode. A voltage corresponding to the amount of charges is generated in each pixel electrode, and the liquid crystal in the liquid crystal layer is oriented in accordance with the voltage. Therefore, light passes through the pixel at a predetermined transmittance.

Thereafter, the switching element is turned OFF. Ideally, however, the accumulated charges are maintained, which causes the voltage not to change and the light transmittance to remain constant. However, in reality, when the switching element is turned OFF, the charges stored in the pixel gradually leak out, and the voltage of the pixel electrode also drops. This also causes a gradual decrease in light transmittance.

For this reason, as shown in (b), at timing S1 when the lower end is scanned during one scanning period, the large amount of charge leakage has occurred at the pixels connected to the scanning line at the upper end that are charged at the very beginning of the one scanning period, and the transmittance of the pixels is the smallest. On the other hand, the pixels connected at the lower end have been charged immediately before, so there is little charge leakage and the transmittance is the highest.

In contrast, at timings S2 to S4 when the position of the scanning line being scanned is between the upper end and the lower end, the scanning line scanned immediately before and the scanning line to be scanned next are adjacent to each other, whereby the pixels with the highest transmittance and the pixels with the lowest transmittance are adjacent. The greater the transmittance of the liquid crystal panel 50, the higher the brightness of the liquid crystal panel 50 provided by the backlight 70. For this reason, at timings S2 to S4, the display region of the liquid crystal panel 50 has striped brightness unevenness (stripe unevenness) caused by the brightest region and the darkest region adjacent to each other across the scanning position.

When the backlight 70 is constantly turned on, the position at which the scanning line is scanned moves sequentially from the upper end to the lower end during one scanning period, which causes the above-mentioned brightness unevenness to be averaged out and made not noticeable. However, when the backlight 70 is periodically turned off at a timing synchronized with one scanning period and the infrared light-emitting element is turned on during that period, stripe unevenness occurs at a specific position. Furthermore, if the turning-off of the backlight 70 is not synchronized with one scanning period, the brightness distribution of the liquid crystal panel 50 changes from moment to moment. In particular, if there is a slight mismatch between the scanning period of the liquid crystal panel 50 and the blinking period of the backlight, beat noise occurs at a frequency corresponding to that mismatch, in which the position of the stripe unevenness moves (flows) at a constant speed.

In the image pickup apparatus equipped with a display function according to the present embodiment, in general, the backlight 70 is turned off and the infrared light-emitting elements 73 are turned on when scanning of the liquid crystal panel 50 is completed, and image taking is performed by the infrared camera 60. For example, as illustrated in FIG. 28, the infrared camera 60 takes images during a period including periods before and after the timing when one scanning period of the liquid crystal panel 50 ends. The infrared light-emitting elements 73 are turned on at a timing slightly earlier than the imaging period, and are turned off with a slight delay after the imaging period of the infrared camera 60 ends. The backlight 70 is turned on while the infrared light-emitting elements 73 are turned off. In other words, the backlight 70 is turned off during the period when the infrared light-emitting elements 73 are turned on.

The period during which the backlight 70 is turned off and the period during which the infrared light-emitting elements 73 are turned on coincide with the period during which the liquid crystal panel 50 is scanned. As described above, the timing at which the backlight 70 is turned off, the timing at which the infrared light-emitting elements 73 are turned on, and the timing at which the infrared camera 60 takes an image roughly coincide with the end of one scanning period of the liquid crystal panel 50, i.e., the timing at which the scanning line at the lower end is scanned.

Figure 29:
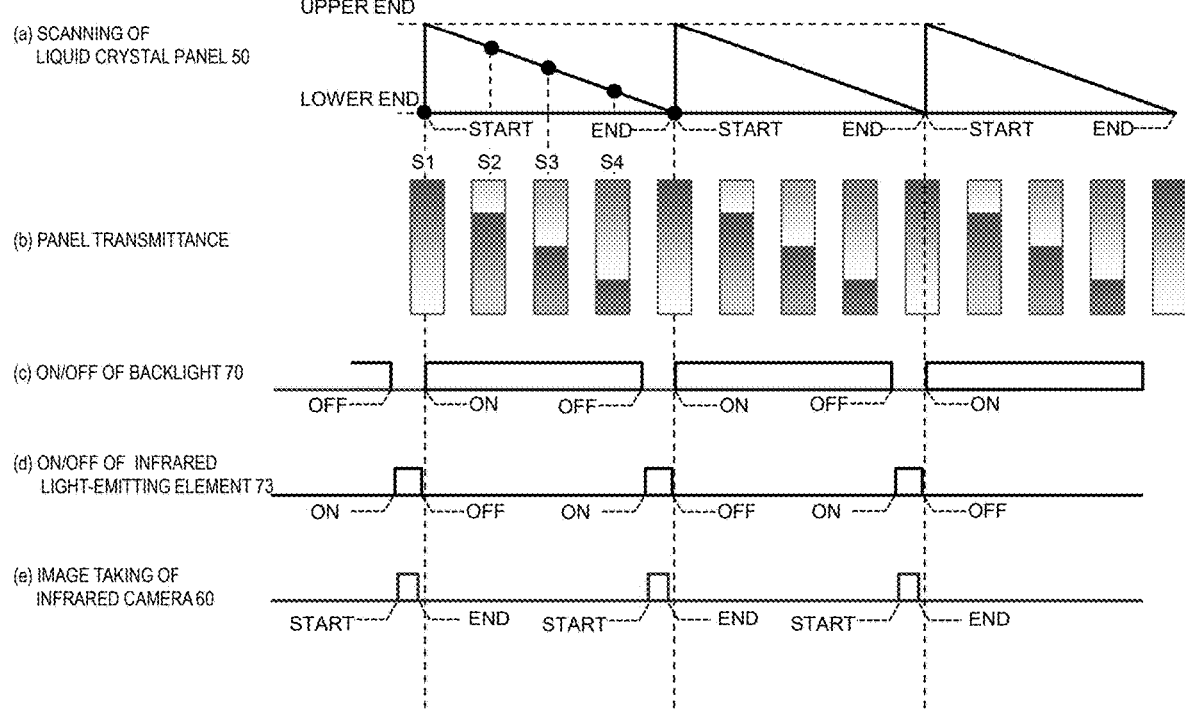
FIG. 29 is another timing chart showing operation timings of respective parts of the image pickup apparatus equipped with a display function according to the seventh embodiment.
Figure 30:
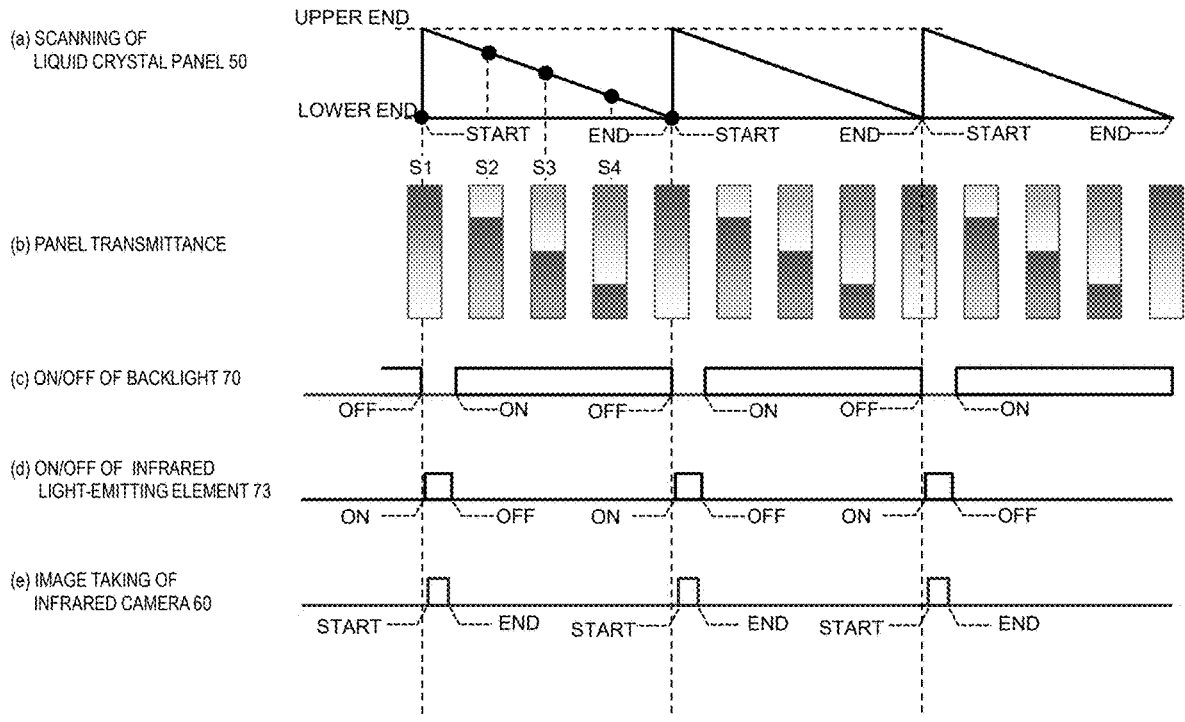
FIG. 30 is another timing chart showing operation timings of respective parts of the image pickup apparatus equipped with a display function according to the seventh embodiment.
Figure 31:
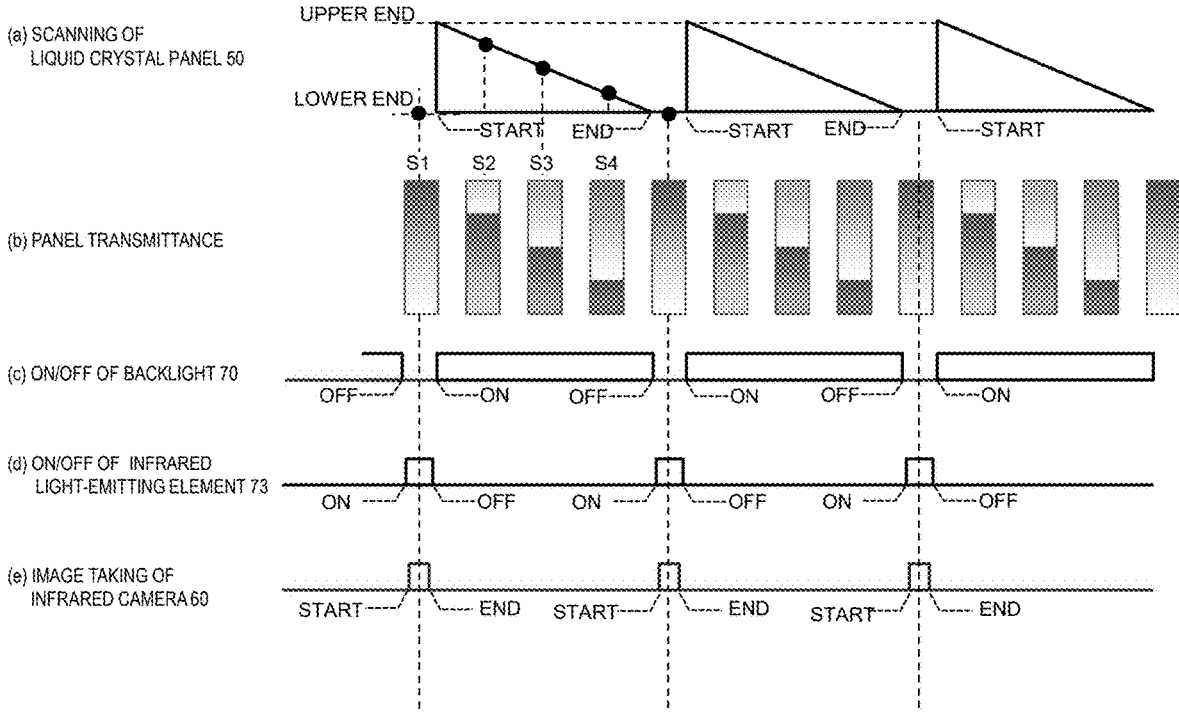
FIG. 31 is another timing chart showing operation timings of respective parts of the image pickup apparatus equipped with a display function according to the seventh embodiment.

Moreover, the backlight 70, the infrared light-emitting elements 73, and the infrared camera 60 may be controlled at the timings shown in FIGS. 29 to 31. In the example shown in FIG. 29, the backlight 70 is turned off, the infrared light-emitting elements 73 are turned on, and the infrared camera 60 takes an image at the timing of scanning the lower end portion of the scanning lines, which are the scanning line at the lower end and the scanning lines immediately preceding the same. In the example shown in FIG. 30, the backlight 70 is turned off, the infrared light-emitting elements 73 are turned on, and the infrared camera 60 takes an image at the timing of scanning the upper end portion of the scanning lines, which are the scanning line at the upper end and the scanning lines immediately following the same. In the example shown in FIG. 31, a scanning line rest period is provided between scanning periods, and in the period after scanning of the liquid crystal panel 50 is completed and before the start of the next scan, the backlight 70 is turned off, the infrared light-emitting elements 73 are turned on, and the infrared camera 60 takes an image.

By carrying out such control, the backlight 70 is turned off when the infrared camera 60 takes an image. Therefore, during image taking, the influence of visible light from the backlight 70 can be suppressed, and a clear image can be acquired by the infrared camera 60. Specifically, even if the visible light blocking performance of the infrared transmission filter 64 of the infrared camera 60 is insufficient, visible light will not reach the imaging element 61. Therefore, a clear image can be captured without an increase in the black level of the captured image or a decrease in the S/N ratio.

Furthermore, by fixing the scanning position of the panel when the backlight is turned off, beat noise and the like that may be caused by a change in brightness due to the backlight 70 being turned off can be suppressed. Furthermore, by turning off the backlight 70 approximately at a timing when scanning of the liquid crystal panel 50 is completed, at a timing after scanning of the liquid crystal panel is completed and before the start of the next scan, or at a timing when the upper end portion or the lower end portion of the display region is being scanned, it is made possible to suppress the occurrence of stripe unevenness and the like and to reduce the impact on the image display.

Eighth Embodiment

Figure 32:
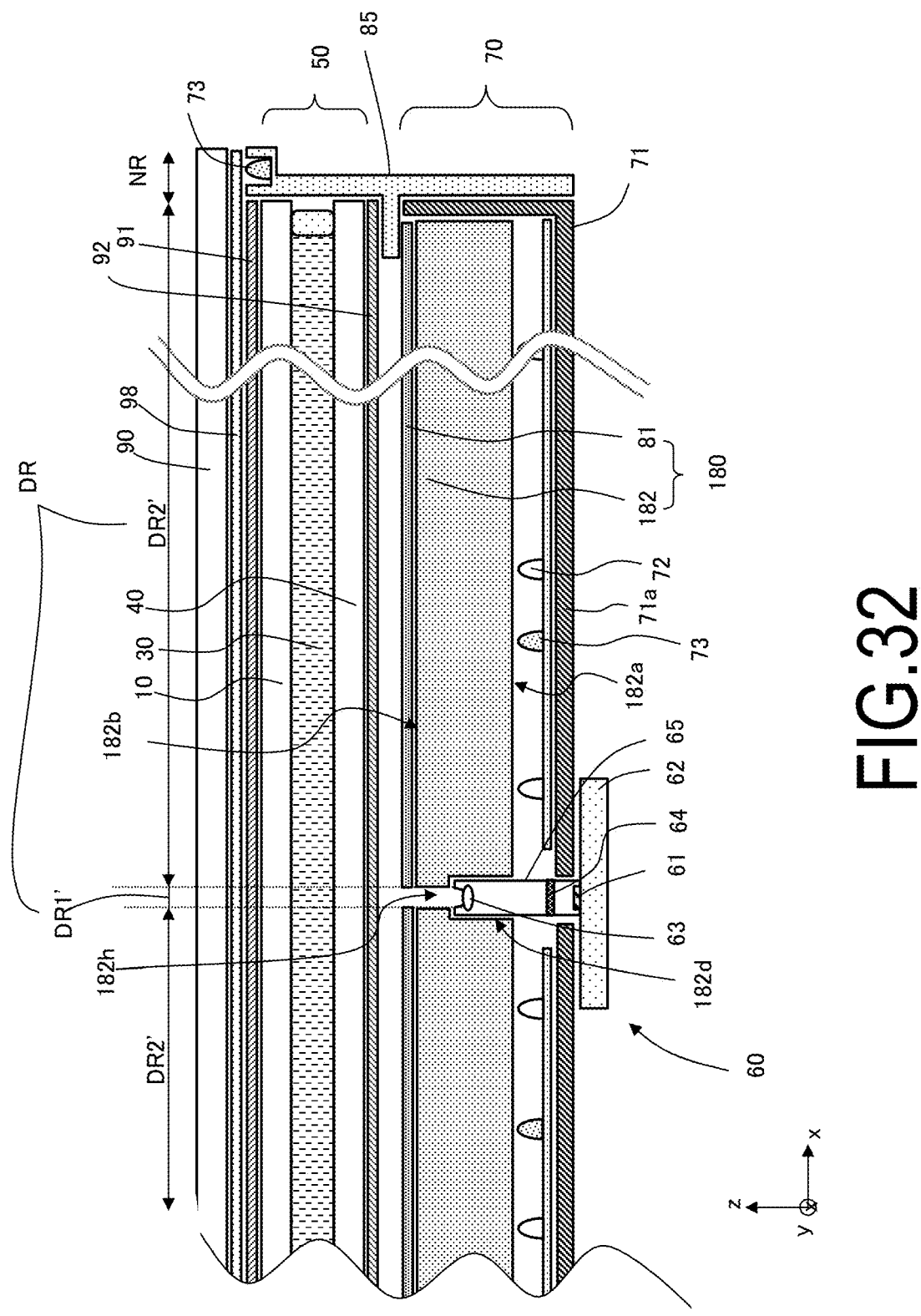
FIG. 32 is a schematic cross-sectional view of an image pickup apparatus equipped with a display function according to an eighth embodiment.

FIG. 32 is a schematic cross-sectional view of a main portion of an image pickup apparatus equipped with a display function according to the present embodiment. The image pickup apparatus equipped with a display function according to the present embodiment differs from the sixth embodiment in that it further includes a half mirror 98.

The half mirror 98 is disposed in front of a liquid crystal panel 50. In the present embodiment, the half mirror 98 is located between a cover glass 90 and the liquid crystal panel 50. The half mirror 98 covers an entirety of a display region DR, and is superposed on an entirety of a through-hole 182*h* of a diffuser 182 in a plan view.

Preferably the half mirror 98 has, as its characteristic, a higher transmittance with respect to infrared light than that with respect to visible light. For example, preferably the transmittance of the half mirror 98 at a wavelength of 940 nm is greater than the transmittance thereof at a wavelength of 550 nm. The half mirror 98 having such optical characteristics can be made of a dielectric multilayer film.

With this configuration, the image pickup apparatus equipped with a display function according to the present embodiment also functions as a mirror. For this reason, it can be suitably used, for example, as a rearview mirror of a vehicle. Specifically, by displaying an image captured by a camera that captures the rear of the vehicle on the liquid crystal panel 50, the apparatus can be used as an electronic mirror. In addition, depending on the driver's choice, or when the power source for driving the image pickup apparatus equipped with a display function is lost, the mirror can also be used as a normal mirror.

In addition, since the driver needs to look at the rearview mirror, it is difficult for obstacles to be disposed between the driver and the rearview mirror. Therefore, the image pickup apparatus equipped with a display function according to the present embodiment, which is arranged at the position of the rearview mirror, can reliably capture an image of the driver using the infrared camera 60, making it possible to appropriately monitor the driver's condition.

Furthermore, since the half mirror 98 has a high transmittance with respect to infrared light, a good infrared image can be acquired.

OTHER EMBODIMENTS

Various modifications can be made on the image pickup apparatus equipped with a display function of the disclosure. First, the driving method of the liquid crystal panel is not limited to FFS, and the liquid crystal panel may be driven by IPS or another driving method. Although the light path of the light transmitted through the first region DR1 or DR1' and incident on the imaging element 61 of the infrared camera 60 is a straight line in the present embodiment, the light path may be bent by a mirror or the like in a direction parallel to the back face 50*b* of the liquid crystal panel 50. In this case, the infrared camera can be disposed on a side surface of the liquid crystal panel 50, and therefore the entire thickness of the image pickup apparatus equipped with a display function can be reduced. Further, two or more embodiments among the first to fourth embodiments can be combined as long as consistency is ensured.

In the first to eighth embodiments, the image pickup apparatus equipped with a display function includes the optical structure having the diffuser plate. However, in the backlight, in a case where the display light-emitting element and the infrared light-emitting element are covered with a diffusion member or the like and when uniform light is emitted from the backlight, the optical structure may be allowed not to include the diffuser plate. In this case, no through-hole is provided in the optical structure, and the light transmitted through the first region may be further transmitted through the optical structure to be incident on the imaging element. In addition, by the optical function of the optical structure being provided in the backlight, the image pickup apparatus equipped with a display function may be allowed not to include the optical structure.

Furthermore, by being equipped with the above-mentioned backlight, optical structure, and infrared camera, the image pickup apparatus equipped with a display function according to the fifth embodiment can suppress a decrease in brightness in the region of the liquid crystal panel where the infrared camera is located, making it difficult to notice the presence of the infrared camera, even if the infrared camera is disposed on the backlight side. Such a configuration including a backlight, an optical structure, and an infrared camera can be said to be an image pickup device equipped with a light source for a liquid crystal panel, and has the above-mentioned effects.

Specifically, the image pickup device equipped with a light source for a liquid crystal panel disclosed in the fifth embodiment includes: a backlight including a display light-emitting element; an optical structure including a diffuser arranged at a position at which the diffuser transmits light emitted from the display light-emitting element; and an infrared camera including a condenser lens, an imaging element, and a lens-barrel that supports the condenser lens with a predetermined space being interposed between the condenser lens and the imaging element, at least a part of the lens-barrel being located on a backlight side with respect to the diffuser; wherein the diffuser includes a through-hole, the through-hole of the diffuser is superposed on the lens-barrel in a plan view, and the through-hole has a smaller area than that of the lens-barrel in a plan view.

Such an image pickup device equipped with a light source for a liquid crystal panel can be used not only as a display device for an instrument panel, but also suitably as an image pickup apparatus equipped with a display function that can display images without making the viewer aware of the presence of the image pickup device. Furthermore, depending on the use of an image acquired by the image pickup device, or as long as the acquired image can be subjected to appropriate image processing according to its use, the image captured by the infrared camera does not always need to be clear. For this reason, the image pickup device equipped with a light source for a liquid crystal panel according to the fifth embodiment can also be combined with a liquid crystal panel having a black matrix arranged on the front side, and such a combination can also realize an image pickup apparatus equipped with a display function that makes the presence of the infrared camera less noticeable.

The image pickup apparatus equipped with a display function of the disclosure can be explained as follows.

An image pickup apparatus equipped with a display function according to a first configuration of the disclosure includes:

a liquid crystal panel;

an infrared camera including a condenser lens and an imaging element; and a backlight disposed on a back face of the liquid crystal panel, wherein the liquid crystal panel includes a display region including a first region and a second region located to surround the first region in a plan view, at least the imaging element of the infrared camera is disposed on a light path of light transmitted through the first region and the condenser lens, and the liquid crystal panel does not include a black matrix at least in the first region but includes color filters in the first region and the second region.

According to the first configuration, since no black matrix is included in the first region, an influence of a diffraction image of an image is suppressed, and a clear infrared image can be acquired. Further, the second region is located to surround the first region, and an image can be displayed in the first region and the second region. That is, the infrared camera can be disposed on the back face of the liquid crystal panel, not at an end portion thereof. Therefore, for example, in a case where this image pickup apparatus equipped with a display function is used for photographing a driver, it is possible to monitor a state of the driver while providing a comfortable driving environment without causing the driver to recognize the presence of the camera (without applying pressure).

An image pickup apparatus equipped with a display function according to another first configuration of the disclosure includes:

a liquid crystal panel including a display region;

an infrared camera including a condenser lens and an imaging element; and a backlight disposed on the back face of the liquid crystal panel, wherein at least the imaging element of the infrared camera is disposed on a light path of light transmitted through the display region of the liquid crystal panel and the condenser lens, and the liquid crystal panel does not include a black matrix but includes color filters in the display region.

An image pickup apparatus equipped with a display function according to a second configuration is as follows: in the first configuration, a color filter of each pixel may be in contact with a color filter of an adjacent pixel in a first region. Since the color filters of the respective pixels are in contact with each other in the first region, even in a case where there is no black matrix, leakage of light emitted without passing through the filter is suppressed, thereby making it possible to display a correct color display image.

An image pickup apparatus equipped with a display function according to a third configuration is as follows: in the first configuration, the liquid crystal panel may include a black matrix disposed in such a manner as to at least overlap a boundary between adjacent pixels in the second region. Light leakage can be suppressed by providing the black matrix in the second region.

An image pickup apparatus equipped with a display function according to a fourth configuration is as follows: as for the color filters in the first configuration, a color filter of each pixel may be in contact with a color filter of an adjacent pixel in a region 90% or more of a display region including the entire first region and at least part of the second region. Since no black matrix is provided in the first region and the second region, a difference in viewability between the first region and the second region can be reduced when the screen is viewed.

An image pickup apparatus equipped with a display function according to a fifth configuration is as follows: in the first configuration, the color filters may include at least three or more different monochromatic filters, and two or more different monochromatic filters may be superposed at a region in contact with a boundary between adjacent pixels of the pixels in the first region. Since two or more monochromatic filters are superposed at a boundary between pixels, the transmittance of visible light decreases, and mixing of light between adjacent pixels is suppressed.

An image pickup apparatus equipped with a display function according to a sixth configuration is as follows: in the first configuration, the color filters may include at least three or more different monochromatic filters, and two or more different monochromatic filters may be superposed at a region in contact with a boundary between adjacent pixels of the pixels in the entire first region and at least part of the second region.

An image pickup apparatus equipped with a display function according to a seventh configuration is as follows: in the first configuration, the color filters may include at least three or more different monochromatic filters, and three or more different monochromatic filters may be superposed at a region in contact with a boundary between adjacent pixels of the pixels in the first region. Since three or more monochromatic filters are superposed at a boundary between pixels, the transmittance of visible light decreases, and mixing of light between adjacent pixels is suppressed.

An image pickup apparatus equipped with a display function according to an eighth configuration is as follows: in the fourth configuration, the color filters may include at least three or more different monochromatic filters, and three or more different monochromatic filters may be superposed at a region in contact with a boundary between adjacent pixels of the pixels in the entire first region and at least part of the second region.

An image pickup apparatus equipped with a display function according to a ninth configuration is as follows: in the first configuration, the infrared camera may further include a condenser lens located on the light path and between the liquid crystal panel and the imaging element, and an area of the first region may be equal to or larger than an opening area of the condenser lens.

An image pickup apparatus equipped with a display function according to a tenth configuration may further include a first polarizer disposed in front of the liquid crystal panel and a second polarizer disposed between the liquid crystal panel and the backlight in the first configuration, and the first polarizer and the second polarizer may overlap the first region and the second region. Since the polarizer is not processed, the cost can be reduced. An image can be displayed in the first region similarly to the second region.

An image pickup apparatus equipped with a display function according to an eleventh configuration further includes an optical structure including at least one optical sheet disposed between the second polarizer and the backlight in the first configuration, and the optical structure has an optical structure through-hole in a region overlapping the first region. Since the optical structure is not located on the light path of the infrared camera, a clear image can be acquired.

An image pickup apparatus equipped with a display function according to a twelfth configuration is as follows: in the eleventh configuration, an opening area of the optical structure through-hole may be equal to or larger than an opening area of the condenser lens. This suppresses missing of the field of view of the camera.

An image pickup apparatus equipped with a display function according to a thirteenth configuration is as follows: in the eleventh configuration, an opening area of the optical structure through-hole may be equal to or smaller than an area of the first region.

An image pickup apparatus equipped with a display function according to a fourteenth configuration is as follows: in the eleventh configuration, an opening area of the optical structure through-hole may be equal to or larger than an opening area of the lens, and the opening area of the optical structure through-hole is equal to or smaller than an area of the first region.

An image pickup apparatus equipped with a display function according to a fifteenth configuration is as follows: in the ninth configuration, the backlight may include a chassis having a base facing the display region and a plurality of display light-emitting elements disposed on the base, and the condenser lens may be located between the base of the chassis and the liquid crystal panel.

An image pickup apparatus equipped with a display function according to a sixteenth configuration is as follows: in the fifteenth configuration, the backlight may further include at least one infrared light-emitting element disposed on the base. With this configuration, the infrared light for photographing can be emitted from the front of the driver. Further, a situation in which stray light is incident on the condenser lens may be suppressed by the disposition on the base.

An image pickup apparatus equipped with a display function according to a seventeenth configuration is as follows: in the fifteenth configuration, the backlight may further include a partition structure that includes a plurality of reflective surfaces each located between the plurality of display light-emitting elements and is disposed on the base of the chassis, and one of the plurality of reflective surfaces may be located between at least one infrared light-emitting element and the condenser lens.

An image pickup apparatus equipped with a display function according to an eighteenth configuration is as follows: in the ninth configuration, the backlight may include a chassis having a base facing the display region, a light guide plate disposed on the base, and a display light-emitting element disposed on a side surface of the light guide plate, and the condenser lens may be located between the base of the chassis and the liquid crystal panel.

An image pickup apparatus equipped with a display function according to a nineteenth configuration is as follows: in the eighteenth configuration, the backlight may further include an infrared light-emitting element disposed on the side surface of the light guide plate.

An image pickup apparatus equipped with a display function according to a twentieth configuration is as follows: in the eighteenth configuration, the backlight may further include at least one infrared light-emitting element that is disposed facing a main surface of the light guide plate.

An image pickup apparatus equipped with a display function according to a twenty-first configuration is as follows: in the fourteenth or eighteenth configuration, the infrared camera may further include a circuit substrate including a drive circuit configured to drive the imaging element, the imaging element may be mounted on the circuit substrate, the chassis may have a chassis through-hole provided at a position overlapping the first region in a plan view, and the circuit substrate may be disposed at an outer side of the chassis in such a manner that the imaging element is located in the chassis through-hole. With this configuration, the thickness of the backlight can be reduced, and a situation in which the in-plane uniformity of the backlight is degraded can be suppressed.

An image pickup apparatus equipped with a display function according to a twenty-second configuration is as follows: in the ninth configuration, the infrared camera may further include an infrared transmission filter that is disposed on the light path and exhibits higher transmittance at a wavelength of 920 nm than at a wavelength of 550 nm. With this, stray light of visible light is suppressed.

An image pickup apparatus equipped with a display function according to a twenty-third configuration is as follows: in the twenty-second configuration, the infrared transmission filter may be located between the condenser lens and the imaging element. This makes it possible to efficiently suppress stray light.

An image pickup apparatus equipped with a display function according to a twenty-fourth configuration is as follows: in the ninth configuration, the backlight may further include a shading body having a pillar shape, disposed in the chassis to surround the light path, and configured to block infrared light. With this, infrared stray light can be suppressed.

An image pickup apparatus equipped with a display function according to a twenty-fifth configuration is as follows: in the twenty-fourth configuration, transmittance of the shading body at a wavelength of 920 nm may be equal to or smaller than the transmittance thereof at a wavelength of 550 nm. With this, infrared stray light can be suppressed.

An image pickup apparatus equipped with a display function according to a twenty-sixth configuration is as follows: in the twenty-fifth configuration, the shading body may transmit visible light. Since the shading body transmits visible light, light emitted from the backlight also reaches the first region, thereby making it possible to suppress a situation in which the first region becomes dark.

An image pickup apparatus equipped with a display function according to a twenty-seventh configuration is as follows: in the first configuration, the liquid crystal panel may include a TFT substrate, a counter substrate, and a liquid crystal layer disposed between the TFT substrate and the counter substrate, and the TFT substrate may include a plurality of scanning lines arranged in the display region, extending in a first direction, and arrayed in a second direction different from the first direction, a plurality of data lines extending in the second direction and arrayed in the first direction, a plurality of switching elements each connected to one of the plurality of scanning lines and one of the plurality of data lines, and a plurality of pixel electrodes respectively connected to the plurality of switching elements, and two-dimensionally arrayed in the first direction and the second direction.

An image pickup apparatus equipped with a display function according to a twenty-eighth configuration is as follows: in the twenty-seventh configuration, eight or more of the plurality of scanning lines, eight or more of the plurality of data lines, eight or more of the plurality of switching elements, and eight or more of the plurality of pixel electrodes may be located in the first region of the liquid crystal panel.

An image pickup apparatus equipped with a display function according to a twenty-ninth configuration is as follows: in the twenty-seventh configuration, the plurality of scanning lines, the plurality of data lines, the plurality of switching elements, and the plurality of pixel electrodes may respectively be located in the first and second regions of the liquid crystal panel, and an area of the pixel electrode in the first region may be in a range from 0.5 times to 1.5 times an area of the pixel electrode in the second region.

An image pickup apparatus equipped with a display function according to a thirtieth configuration is as follows: in the twenty-seventh configuration, the plurality of scanning lines, the plurality of data lines, the plurality of switching elements, and the plurality of pixel electrodes may respectively be located in the first and second regions of the liquid crystal panel, and an interval between the adjacent scanning lines in the first region may be in a range from 0.5 times to 1.5 times an interval between the adjacent scanning lines in the second region.

An image pickup apparatus equipped with a display function according to a thirty-first configuration is as follows: in the twenty-seventh configuration, the plurality of scanning lines, the plurality of data lines, the plurality of switching elements, and the plurality of pixel electrodes may respectively be located in the first and second regions of the liquid crystal panel, and an interval between the adjacent data lines in the first region may be in a range from 0.5 times to 1.5 times an interval between the adjacent data lines in the second region.

An image pickup apparatus equipped with a display function according to a thirty-second configuration is as follows: in the twenty-seventh configuration, the plurality of scanning lines, the plurality of data lines, the plurality of switching elements, and the plurality of pixel electrodes may respectively be located in the first and second regions of the liquid crystal panel, and an interval between the adjacent switching elements in the first region may be in a range from 0.5 times to 1.5 times an interval between the adjacent switching elements in the second region.

An image pickup apparatus equipped with a display function according to a thirty-third configuration is as follows: in the twenty-seventh configuration, the plurality of scanning lines, the plurality of data lines, the plurality of switching elements, and the plurality of pixel electrodes may respectively be located in the first and second regions of the liquid crystal panel, an area of the pixel electrode in the first region may be in a range from 0.5 times to 1.5 times an area of the pixel electrode in the second region, an interval between the adjacent scanning lines in the first region may be in a range from 0.5 times to 1.5 times an interval between the adjacent scanning lines in the second region, and an interval between the adjacent data lines in the first region may be in a range from 0.5 times to 1.5 times an interval between the adjacent data lines in the second region. According to the twenty-eighth to thirty-first configurations, an integrated image or moving picture can be displayed in the first region and the second region without separately performing special image processing.

An image pickup apparatus equipped with a display function according to a thirty-fourth configuration is as follows: in the twenty-seventh configuration, the plurality of pixel electrodes may include a plurality of first pixel electrodes and a plurality of second pixel electrodes, and one of the plurality of first pixel electrodes and one of the plurality of second pixel electrodes may be adjacent to each other in the first direction and may be arranged between a pair of data lines adjacent to each other in the first direction. Even in a case where a pixel pitch is shortened by reducing the number of data wiring lines, a situation in which an interval between diffraction images is widened and the image becomes unclear is suppressed by widening the interval between the data lines to serve as a diffraction lattice.

An image pickup apparatus equipped with a display function according to a thirty-fifth configuration is as follows: in the thirty-fourth configuration, the plurality of scanning lines may include a plurality of first scanning lines and a plurality of second scanning lines; one of the plurality of first scanning lines and one of the plurality of second scanning lines may be arranged between the pixel electrodes adjacent in the second direction of the plurality of pixel electrodes; and the first pixel electrode and the second pixel electrode arranged between a pair of adjacent data lines may be connected to the first scanning line and the second scanning line, respectively, via the switching elements. This makes it possible to reduce the number of data lines.

An image pickup apparatus equipped with a display function according to a thirty-sixth configuration is as follows: in the first configuration, the liquid crystal panel may operate in the normally black mode. With this, light leakage in black display can be suppressed.

An image pickup apparatus equipped with a display function according to a thirty-seventh configuration of the disclosure includes:

a liquid crystal panel including a display region;

an infrared camera including a condenser lens, an imaging element, and a lens-barrel that supports the condenser lens with a predetermined space being interposed between the condenser lens and the imaging element;

a backlight disposed on a back face of the liquid crystal panel; and an optical structure disposed between the liquid crystal panel and the backlight, the optical structure including a diffuser wherein the diffuser includes a through-hole, the through-hole of the diffuser is superposed on the lens-barrel in a plan view, and the through-hole has a smaller area than that of the lens-barrel in a plan view.

This configuration causes light from the diffuser to enter the lens-barrel region, and makes the opening area of the through-hole small. This thereby can reduce the region of the infrared camera where the brightness is likely to decrease, and can make the presence of the infrared camera less noticeable. In addition, this can improve the uniformity of the light emitted from the backlight in the display region.

An image pickup apparatus equipped with a display function according to a thirty-eighth configuration may be as follows: in the thirty-seventh configuration, the diffuser includes a first main surface located on a side of the backlight, a second main surface located on a side of the liquid crystal panel, and a recessed part disposed on the first main surface, the through-hole is located between a bottom face of the recessed part and the second main surface, and a part of the lens-barrel may be located within the recessed part of the diffuser.

This configuration makes it easy to align the diffuser with the lens-barrel holding the condenser lens, and the like, and because the diffuser is a single member, assembly is also easy.

An image pickup apparatus equipped with a display function according to a thirty-ninth configuration may be the thirty-seventh configuration that further includes at least one infrared light-emitting element disposed in a non-display region located outside the display region. This configuration prevents infrared light emitted from the infrared light-emitting element for image taking from becoming stray light within the backlight and entering the infrared camera. This makes it possible to acquire a clear image.

An image pickup apparatus equipped with a display function according to a fortieth configuration may be as follows: in the thirty-seventh configuration, the backlight includes a chassis having a base facing the display region, as well as a plurality of display light-emitting elements and a plurality of infrared light-emitting elements disposed on the base.

According to the present configuration, the infrared light-emitting elements are disposed in the backlight, which can make the frame region narrow. Furthermore, by arranging a plurality of display light-emitting elements and a plurality of infrared light-emitting elements at respective equal pitches, infrared light for image taking can be emitted uniformly. Furthermore, by making the arrangement pitch of the infrared light-emitting elements larger than the arrangement pitch of the display light-emitting elements, it becomes possible to arrange the infrared light-emitting elements away from the infrared camera, and this makes it possible to prevent the infrared light emitted from the infrared light-emitting elements from directly entering the infrared camera as stray light.

An image pickup apparatus equipped with a display function according to a forty-first configuration may be as follows: in the thirty-seventh configuration, the diffuser includes a first diffuser plate and a second diffuser plate, the first diffuser plate and the second diffuser plate have a first through-hole and a second through-hole, respectively, the opening area of the second through-hole is larger than the opening area of the first through-hole, and the first diffuser plate and the second diffuser plate are laminated such that the axis of the first through-hole coincides with the axis of the second through-hole.

According to the present configuration, the diffuser is formed with two plate-like members, which allows the diffuser to be formed more easily. In addition, the optical properties of the first diffuser plate and the second diffuser plate are made different from each other, which allows the optical function of the entire diffuser to be adjusted. For example, the material cost can be reduced by reducing the haze value of the second diffuser plate.

An image pickup apparatus equipped with a display function according to a forty-second configuration may be as follows: in the thirty-seventh configuration, wherein the optical structure further includes a second diffuser located between the liquid crystal panel and the diffuser, and in the second diffuser, the haze value for visible light is greater than the haze value for infrared light.

According to this configuration, a through-hole is provided in the diffuser, whereby in the region above the through-hole, there is no diffusion light in the vertical direction in the visible light from the backlight, and the visible light contains only diffused light that is emitted obliquely from the region surrounding the through-hole in the diffuser toward the region above the through-hole. The second diffuser diffuses the light emitted from the diffuser in vertical and oblique directions, and therefore, in the region above the through-hole also, visible light from the backlight is emitted in the vertical direction due to diffusion by the second diffuser. As a result, the light emitted from the second diffuser is emitted vertical and oblique directions in the region above the through-hole of the diffuser, just like in regions other than the region above the through-hole, and there is no difference in the diffusion state of the light between the through-hole and other regions. In other words, this structure causes the visible light from the backlight to be more scattered, making the boundary between the first and second regions less noticeable. Furthermore, since the haze value for infrared light in the second diffuser is smaller than the haze value for visible light, an infrared image can be taken with good resolution.

An image pickup apparatus equipped with a display function according to a forty-third configuration may be as follows: in the first or thirty-seventh configuration, the infrared camera takes an image during at least a part of a period during which the backlight is turned off. With this configuration, the infrared camera takes an image when the backlight is turned off, which makes it possible to suppress the influence of visible light from the backlight during image taking, and to acquire a clear image with the infrared camera.

An image pickup apparatus equipped with a display function according to a forty-fourth configuration may be the forty-third configuration that further includes an infrared light-emitting element, wherein the backlight is turned off at a timing when scanning of the liquid crystal panel is completed, a timing after scanning of the liquid crystal panel is completed and before the start of the next scan, or a timing when the upper end portion or the lower end portion of the display region is being scanned. This makes it possible to suppress beat noise and the like that may be caused by a change in brightness due to the backlight being turned off, and to suppress influences on image display.

An image pickup apparatus equipped with a display function according to a forty-fifth configuration may be the thirty-seventh configuration that further includes a half mirror disposed in front of the liquid crystal panel, wherein an entirety of the through-hole of the diffuser is superposed on the half mirror in a plan view.

With this configuration, the image pickup apparatus equipped with a display function can also function as a mirror. Moreover, by applying the present invention to an in-vehicle rearview mirror, the driver can be monitored without obstacles being disposed between the rearview mirror and the driver.

An image pickup apparatus equipped with a display function according to a forty-sixth configuration may be as follows: in the forty-fifth configuration, the transmittance of the half mirror at a wavelength of 940 nm is greater than the transmittance thereof at a wavelength of 550 nm. With this configuration, a better infrared image can be acquired.

An image pickup device equipped with a light source for a liquid crystal panel according to a forty-seventh configuration of the disclosure may be as follows: in the thirty-sixth to forty-sixth configurations, the liquid crystal panel includes a color filter but no black matrix on a light path of light that passes through the through-hole of the diffuser and the condenser lens to reach the imaging element.

An image pickup device equipped with a light source for a liquid crystal panel according to a forty-eighth configuration of the disclosure includes:

a backlight including a display light-emitting element;

an optical structure including a diffuser arranged at a position at which the diffuser transmits light emitted from the display light-emitting element; and an infrared camera including a condenser lens, an imaging element, and a lens-barrel that supports the condenser lens with a predetermined space being interposed between the condenser lens and the imaging element, at least a part of the lens-barrel being located on a backlight side with respect to the diffuser, wherein the diffuser includes a through-hole, the through-hole of the diffuser is superposed on the lens-barrel in a plan view, and the through-hole has a smaller area than that of the lens-barrel in a plan view.

With this configuration, an image pickup device equipped with a light source for a liquid crystal panel is provided wherein the region of the infrared camera where the brightness is likely to decrease can be reduced, and the presence of the infrared camera can be made less noticeable.

An image pickup device equipped with a light source for a liquid crystal panel according to a forty-ninth configuration may be as follows: in the forty-eighth configuration, the diffuser includes a first main surface located on a side of the backlight, a second main surface located on a side of the liquid crystal panel, and a recessed part disposed on the first main surface, the through-hole is located between a bottom face of the recessed part and the second main surface, and a part of the lens-barrel is located within the recessed part of the diffuser.

The present disclose includes the subject matter disclosed in Japanese Patent Application Number 2023-178641 filed with the Japan Patent Office on Oct. 17, 2023 and Japanese Patent Application Number 2024-178353 filed with the Japan Patent Office on Oct. 10, 2024, and the entire contents of the above-identified applications are hereby incorporated by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An image pickup apparatus equipped with a display function, the image pickup apparatus comprising:

a liquid crystal panel;

an infrared camera including a condenser lens and an imaging element; and a backlight disposed on a back face of the liquid crystal panel, wherein:

the liquid crystal panel includes a display region including a first region and a second region that surrounds the first region in a plan view, at least the imaging element of the infrared camera is disposed on a light path of light transmitted through the first region and the condenser lens, and the liquid crystal panel does not include a black matrix at least in the first region, but includes color filters in the first region and the second region.

2. The image pickup apparatus according to claim 1, wherein, among the color filters in the first region, a color filter of each of pixels is in contact with a color filter of an adjacent pixel.

3. The image pickup apparatus according to claim 2, wherein the liquid crystal panel further includes the black matrix disposed in such a manner to at least overlap a boundary between adjacent pixels in the second region.

4. The image pickup apparatus according to claim 2, wherein the color filters include at least three or more different monochromatic filters, and two or more of the at least three or more different monochromatic filters are superposed at a region in contact with a boundary between adjacent pixels in the first region.

5. The image pickup apparatus according to claim 1, wherein an area of the first region is equal to, or larger than, an opening area of the condenser lens.

6. The image pickup apparatus according to claim 1, wherein the backlight includes a chassis having a base facing the display region and a plurality of display light-emitting elements disposed on the base, and the condenser lens is located between the base of the chassis and the liquid crystal panel.

7. The image pickup apparatus according to claim 6, wherein the infrared camera further includes a circuit substrate including a drive circuit configured to drive the imaging element, the imaging element is mounted on the circuit substrate, the chassis has a chassis through-hole provided at a position overlapping the first region in the plan view, and the circuit substrate is disposed at an outer side of the chassis in such a manner that the imaging element is located in the chassis through-hole.

8. The image pickup apparatus according to claim 1, wherein the infrared camera further includes an infrared transmission filter that is disposed on the light path and that exhibits higher transmittance at a wavelength of 920 nm than at a wavelength of 550 nm.

9. The image pickup apparatus according to claim 6, wherein the backlight further includes a shading body, having a pillar shape, disposed in the chassis to surround the light path, the shading body configured to block infrared light.

10. The image pickup apparatus according to claim 1, wherein the liquid crystal panel further includes a thin film transistor (TFT) substrate, a counter substrate, and a liquid crystal layer disposed between the TFT substrate and the counter substrate, and the TFT substrate includes:

a plurality of scanning lines arranged in the display region, extending in a first direction, and arrayed in a second direction different from the first direction, a plurality of data lines extending in the second direction and arrayed in the first direction, a plurality of switching elements, each connected to one of the plurality of scanning lines and one of the plurality of data lines, and a plurality of pixel electrodes connected, respectively, to the plurality of switching elements, and two-dimensionally arrayed in the first direction and the second direction, wherein;

the plurality of scanning lines, the plurality of data lines, the plurality of switching elements, and the plurality of pixel electrodes are located in the first and second regions of the liquid crystal panel, and an interval between adjacent scanning lines of the plurality of scanning lines in the first region is in a range from 0.5 times to 1.5 times an interval between adjacent scanning lines of the plurality of scanning lines in the second region.

* * * * *